United States Patent [19]

Naito

[11] Patent Number: 4,607,948

[45] Date of Patent: Aug. 26, 1986

[54] DUPLEX RECORDING METHOD AND APPARATUS FOR PRODUCING DUPLEX PRINTING FROM SIMPLEX ORIGINAL

[75] Inventor: Masataka Naito, Yokohama, Japan

[73] Assignee: Canon Kabushiki Kaisha, Tokyo, Japan

[21] Appl. No.: 611,123

[22] Filed: May 17, 1984

[30] Foreign Application Priority Data

May 25, 1983 [JP] Japan .................................. 58-91880

May 25, 1983 [JP] Japan .................................. 58-91881

[51] Int. Cl.[4] ........................ G03B 27/32; G03B 27/52

[52] U.S. Cl. .................................. 355/24; 355/14 SH

[58] Field of Search .................... 355/24, 3 SH, 14 SH

[56] References Cited

U.S. PATENT DOCUMENTS 4,334,765 6/1982 Clark .............................. 355/14 SH 4,355,880 10/1982 Stemmle ......................... 355/14 SH

*Primary Examiner*—Richard A. Wintercorn

*Attorney, Agent, or Firm*—Fitzpatrick, Cella, Harper & Scinto

[57] ABSTRACT

A method of producing duplex copies from simplex originals, including sequentially feeding one at a time simplex originals from a stack of simplex originals to be reproduced as duplex copies; performing, for every other fed originals, first copy operation to produce one sided copies from said every other originals; sequentially feeding again one at a time the same originals; performing, for remaining every other fed originals, second copy operation to form images on such sides of the one sided copy as not bearing the images by the first copy operation step, to produce duplex copies from simplex originals.

27 Claims, 45 Drawing Figures

DUPLEX RECORDING METHOD AND APPARATUS FOR PRODUCING DUPLEX PRINTING FROM SIMPLEX ORIGINAL

BACKGROUND OF THE INVENTION

1. Field of the Invention

The present invention relates to a duplex recording method and apparatus capable of producing a duplex copy, i.e., printing from simplex original, i.e., originals each having an image only on one side, more particularly to electrostatic photographing, laser beam printing or electrostatic filing method and apparatus. Further particularly, the present invention relates to a copying apparatus or method wherein originals are fed in relation to a copying operation to provide duplex copies, i.e., copies each having images on both sides.

2. Description of the Prior Art

An automatic document, or sheet original, feeder is known. When this feeder, inter alia, the feeder of the sheet circulation type, is used for duplex copy, there is a problem. That is, in this type of feeders, the sheet originals are fed to an image exposure station from the bottom of a stack of originals. If, in these feeders, the copying operation is effected for every other originals, starting with the bottommost original, it is necessary to reverse the originals in order for the duplex copy to have correct pages on both sides of the copy sheet, in the case where an odd number of originals are to be reproduced. If, on the other hand, the copying operation is effected for every other originals starting with the second (from the bottom) original, it is necessary to reverse the originals in order for the duplex copy to have correct pages on both sides of the copy sheet, in the case where an even number of originals are to be reproduced. Therefore, longer sheet passages are required with the result of more frequent paper jam occurrences and slower copy operations.

SUMMARY OF THE INVENTION

Accordingly, it is a principal object of the present invention to provide an apparatus and a method, wherein duplex copies can be efficiently produced from simplex originals.

It is another object of the present invention to provide an apparatus and a method, wherein a duplex copy has correct pages of simplex originals on each side of the copy.

It is a further object of the present invention to provide an apparatus and a method, wherein duplex copies can be produced at a high speed from simplex originals.

These and other objects, features and advantages of the present invention will become more apparent upon a consideration of the following description of the preferred embodiment of the present invention taken in conjunction with the accompanying drawings.

DESCRIPTION OF THE PREFERRED EMBODIMENT

Preferred embodiments of the present invention will now be described in conjuction of the accompanying drawings. In the following paragraphs, the explanation will be made with respect to an electrophotographic copying machine, but the present invention is not limited such machines and is applicable to the other types of recording apparatus. The word "copy" is not limited to a photocopy, but covers a printing produced from an information source.

Figure 1:
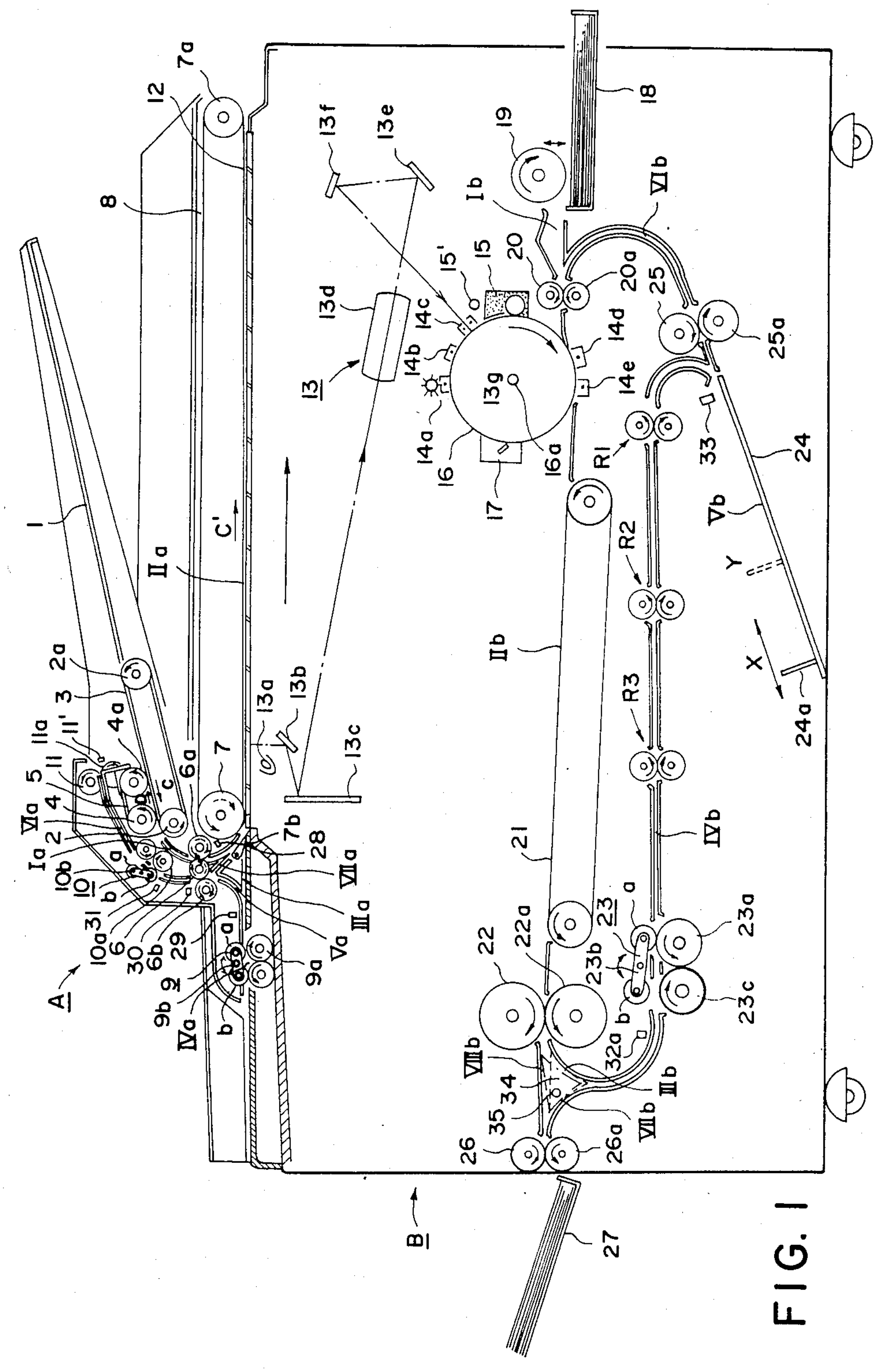
FIG. 1 is a cross-sectional view of an apparatus according to an embodiment of the present invention.

FIG. 1 is a somewhat schematical cross-section of an electrophotographic copying apparatus according to an embodiment of the present invention, wherein various parts and various paths for originals and paths for copy sheets and shown. The apparatus comprises a circulation type original feeder A and copy assembly B for producing duplex copies. The original feeder A includes a first original table 1, inclined toward the lower left as viewed in the figure, for receiving thereon originals. Adjacent to the left side of the first original table 1, there are provided feed rollers 2*a* and 2 around which a feeding belt 3 is entrained. The feeding belt 3 rotates around the feed rollers 2 and 2*a* in the direction of arrow C. To do this, the feed roller 2 is driven by a driving mechanisms which will be described hereinafter. Above the left side feed roller 2, separation rollers 4 and 4*a* are provided, around which a separation belt 5 is entrained. The separation belt 5 rotates in the direction of arrow D. The separation belt 5 cooperates with the feeding belt 3 to separate the bottommost original from the stack of originals placed on the first original table 1. At the lower left of the feed roller 2, there is provided a conveying roller 6 which is selectively rotatable in both directions by a driving mechanism which will be described hereinafter. To the conveying roller 6, rolls 6*a* and 6*b* are press-contacted at substantially opposite sides thereof. Below the feed roller 2, there is a driving roller 7 for driving a conveyor belt 8. The driving roller 7 is selectively rotatable in both directions by a driving mechanism which will be described hereinafter. The conveyor-belt 8 is entrained around the driving roller 7 and a follower roller 7*a*, which is located at the right-hand end of the original feeder A, as viewed in FIG. 1.

A switch-back mechanism 10 is located at the upper left of the feed roller 2, which mechanism 10 will be described in detail hereinafter. Above the separation roller 4*a*, there are discharge rollers 11 and 11*a* which are press-contacted to each other and function to discharge an original, after being copied, back to the first original table 1. The conveying force by the discharge rollers 11*a* and 11*b* is smaller than that of the switch-back mechanisms.

Leftwardly away from the conveyor belt driving roller 7, there is another switch-back mechanism 9, which will be mentioned hereinafter. A photodetector 28 including a light source and a photosensor, is provided in the lower part of the space between the conveyor belt driving roller 7 and the roll 6*a*. A similar photodetector 29 is provided immediately at the right side of the switch-back mechanism 9. Also, a similar photodetector 30' is provided immediately above the roll 6*b*. Further, similar photodetectors 31 and 11' are provided immediately below the switch-back mechanism 10 and adjacent to the right side of the discharge roller 11*a*, respectively.

The photodetector 28 produces a pulse when it detects a trailing edge of an original. It is connected to an original counting means for counting the number of originals in response to the pulses given by the photodetector 28. With a predetermined delay of time after the pulse input, which is determined by a timer means, the pulse is applied to an unshown control circuit.

Various passages or paths are formed for the originals, as follows. A first original path Ia is established between the feeding roller 2 and the conveyor belt driving roller 7 via the roll 6*a* and the conveying roller 6, and it reverses the original on the table 1 and guides it to a platen glass 12; the second original path IIa is formed between the conveyor belt 8 and the platen glass 12; the third original path IIIa, between the conveyor belt driving roller 7 and the switch-back mechanism 9; the fourth original path IVa, within the switch-back mechanism 9; the fifth original path Va, between the switch-back mechanism 9 and the roll 6*b* and the conveying roller 6; the sixth original path VIa, between the switch-back mechanism 10 and the discharge rollers 11 and 11*a*; and the seventh original path VIIa, between the conveyor belt driving roller 7 and the roll 6*b* and the conveyor roller 6. Designated by reference numeral 7*b* is a diversion gate or vane for selectively connecting the second original path IIa to the first original path Ia, the third original path IIIa or the seventh original path VIIa.

The copying assembly B includes a platen glass 12, light source 13*a* for illuminating an image of an original, movable mirrors 13*a* and 13*c*, an imaging lens 13*d* and fixed mirrors 13*e* and 13*f*. The light source 13*a* and the movable mirror 13*b* move integrally with each other in the direction of the arrow to scan an original on the platen 12, while the movable mirror 13*c* moves in the same direction but at a half speed to keep the optical path length constant. The light source 13*a*, movable mirrors 13*b* and 13*c*, imaging lens 13*d* and fixed mirrors 13*e* and 13*f* establish an original scanning optical system 13. The copying assembly B further includes a photosensitive drum 16 having a base conductive layer, a photoconductive layer thereon and an insulating layer further thereon. It rotates about a shaft 16*a* in the direction shown by the arrow in response to a copy signal. Around the photosensitive drum 16, there are provided a pre-exposure/charge-removing discharger 14*a*, a primary charger 14*b*, an image-exposure/charge removing discharger 14*c*, an image exposure station 13*g*, a whole surface exposure light source 15*a* a developing means 15, a transfer discharger 14*d*, a separation discharger 14*e* and a cleaning device 17, in the order named.

The copying assembly B further includes a copy sheet feeding cassette 18, a feed roller 19, registration rollers 20 and 20*a*, and a conveyor belt for conveying the copy sheet, after being subjected to the copying operation, to fixing rollers 22 and 22*a*. Designated by reference numeral 23 is a switch-back mechanism, and 34 is a diversion gate or vane for switching original path, both of which will be described in detail hereinafter. At the diversion gate 34 side of the switch-back mechanism 23, there is a photodetector 32*a* including a light source and a light sensor. The copying assembly B further includes an interim tray 24 provided with a trailing end stopper 24*a* which is movable between positions X and Y. The interim tray 24 functions to temporally store a one sided copy sheet, namely, a copy sheet having a copied image only on one side thereof. Above the interim tray 24, a photodetector 33 is provided, which includes a light source and a photosensor. The one sided copy sheets stored on the interim tray 24 are fed therefrom for the copy operation to the other side, by re-feeding rollers 25 and 25*a*. The copy sheets are finally discharged by discharge rollers 26 and 26*a* to a discharge tray 27.

Between the combination of the fixing rollers 22 and 22*a* and the combination of the discharge rollers 26 and 26*a*, there is a diversion gate member 34 having a triangular cross-section rotatable about a shaft 35 by an unshown mechanism. When it takes a first position shown by broken lines, a third copy sheet path IIIb which extends from the fixing rollers 22 and 22*a* to the interim tray 24 is closed, whereas an eighth copy sheet path VIIIb which is from the fixing rollers 22 and 22*a* to the discharge rollers 26 and 26*a* is opened. When, on the other hand, the gate member 34 takes its second position shown by chain lines, the third copy sheet IIIb is opened, while the eighth path VIIIb is closed. Irrespective of the positions of the diversion gate member 34, a seventh copy sheet path VIIb extending from the switch-back mechanism 23 to the discharge rollers 26 and 26*a* are kept opened.

Various other copy sheet paths are formed as follows. A first copy sheet path Ib is formed between the copy sheet feeding cassette 18 and the registration rollers 20 and 20*a*; a second copy sheet path IIb is established between the photosensitive drum 16 and the fixing rollers 22 and 22*a*; a fourth copy sheet path IVb, between the switch-back mechanism 23 and the interim tray 24; a fifth copy sheet path Vb, between the interim tray 24 and the feeding roller 25; and a sixth copy sheet path VIb, between the feeding roller 25 and the registration roller 20 and 20*a*. In the fourth path IVb, couples R1, R2 and R3 of rollers are arranged which are driven by an unshown mechanism.

The switch-back mechanisms 9, 10 and 23 each include a couple of rollers which are contacted to each other and therefore rotated in the opposite rotational directions. Above those rollers, rolls a and b are provided, which are independently rotatable from each other, but are journaled on a single connecting member, 9b, 10b or 23b. The connecting member 9b, 10b or 23b is in turn journaled on a fixed shaft at its center, so that the connecting member 9a, 10b or 23b is pivotable about it. One of the rolls a and b is contacted to the opposed one of the roller and driven in one direction. The other of rolls rotates in the opposite direction. Take the switch-back mechanism 23 for the copy sheets, for instance, the lower right driving roller 23a is pivoted in a counterclockwise direction by an unshown driving mechanism, so that the upper right roll a is rotated. Then, the contacted roller and roll function to convey the copy sheet away from the interim tray 24. At this time, the lower left roller 23c is driven by the contact with the driving roller 23c, but not contacted to the roll b, so that the combination of this roll and this roller has no conveying effect. If the position of the connecting member 23b is changed so that the latter mentioned roll and rollers are contacted, the copy sheet is conveyed toward the interim tray 24 due to their rotation. The switch-back mechanisms 9 and 10 similarly include driving rollers 9a and 10a.

Figure 2:
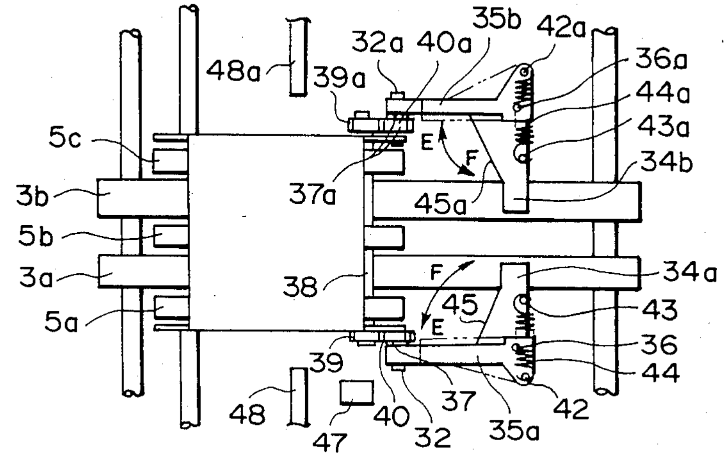
FIG. 2 is a fragmental plan view of the FIG. 1 apparatus.
Figure 3:
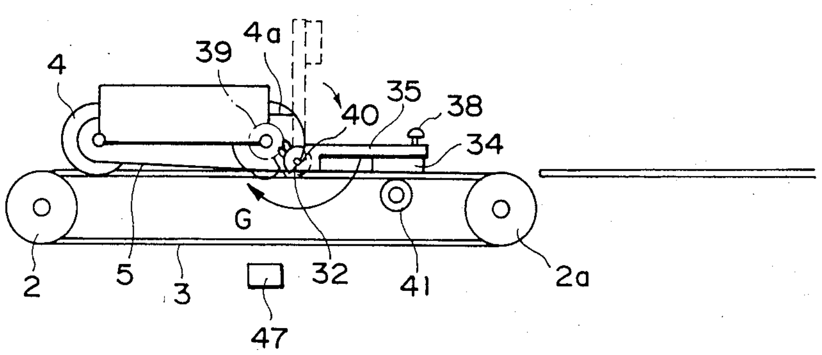
FIG. 3 is a fragmental side view of the FIG. 1 apparatus.

FIGS. 2 and 3 are a plan view and a side view, respectively, of the original separation section of FIG. 1 apparatus, wherein partition plates 34a and 34b are provided to differentiate copied originals and uncopied originals. The partition plates 34a and 34b are pivotably supported on arms 35a and 35b by pivots 36 and 36a. Friction plates 37 and 37a are sandwiched between arm gears 40 and 40a (engaged with gears 39 and 39a fixed to the separation roller shaft 38) and the partition plate arms 35 and 35a journaled on shafts 32 and 32a, respectively, so that when the separation rollers 4 and 4a rotate, the partition plate arms 35a and 35b are urged in the direction shown by arrow G. This promotes the feed of the originals from the table 1. Across the feed belt 3 (3a and 3b) from the partition plate arms 35a and 35b, there are rollers 41 and 41a (only 41 is shown). The partition plates 34a and 34b have respective pins 43 and 43a, while the partition plate arms 35a and 35b have respective pins 42 and 42a, wherein springs 44 and 44a are stretched between the pins 43 and 43a and the pins 44 and 44a, respectively. Because of these arrangement, the partition plates 34a and 34b are moved in the direction shown by arrow E or F, when the lines connecting the pins 42 and 43, and connecting the pins 42a and 43a cross the pivots 36 and 36a, respectively. The outer peripheries 45 and 45a of the partition plates 34a and 34b are effective as cam surfaces, so that, when the partition plates 34a and 34b and the partition plate arms 35a and 35b rotate in the direction of arrow G, the partition plates 34a and 34b move back in the direction shown by arrow F by the shafts 48 and 48a which are mounted so as to engage to cams 45 and 45a, respectively. A photosensor 47 is provided to detect the G direction rotation of the partition plate arm 35a. By this, a termination of one cycle copy operations for the originals, can be discriminated.

Figure 4:
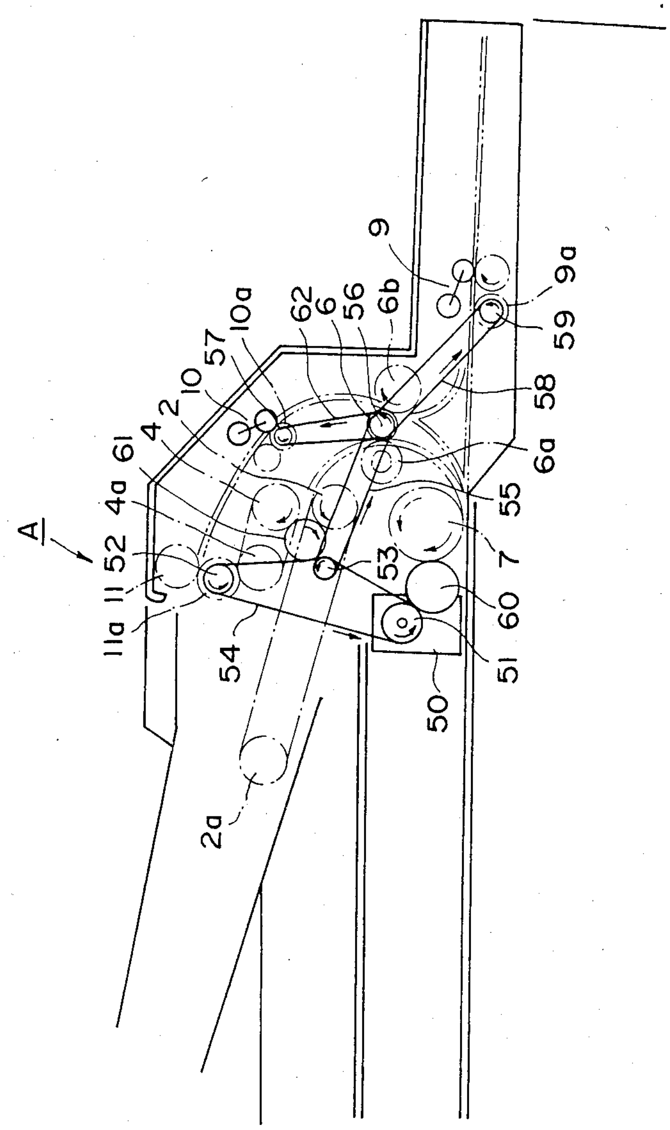
FIG. 4 is a fragmental cross-sectional view of the FIG. 1 apparatus.

FIG. 4 shows in more detail the original feeding station A, including the driving mechanism. The explanation of the elements which have been described in conjunction with FIGS. 1-3 is omitted for the sake of simplicity by assigning them the same reference numerals. The driving mechanism includes a driving motor 50, a pulley 51 fixedly secured to the driving shaft of the motor 50, a pulley 52 fixedly secured to the shaft of the discharge roller 11a, a pulley 53 journaled on an unshown machine frame, a pulley 56 fixedly secured to the shaft of the conveying roller 6, a pulley 57 fixedly secured to the shaft of the driving roller 10a of the switch-back mechanism, and a pulley 59 fixedly secured to the shaft of the driving roller 9a of the switch-back mechanism 9. It further includes a belt 54 entrained around the pulleys 51, 52 and 53, a belt 55 entrained around the pulleys 53 and 56, a belt 62 entrained around pulleys 56 and 57, and a belt 58 entrained around the pulleys 56 and 59.

A clutch 60 is provided to transmit the driving power from the motor 50 to the driving roller 7 through the pulley 51. The clutch 60 can reverse the direction of rotation. There is provided another clutch 61 for transmitting the driving power from the pulley 53 to the feeding roller 2 and the separation roller 4. In the following description, the forward direction of the motor 50 rotation is defined as the counterclockwise direction of the pulley 51 in FIG. 4.

Figure 5:
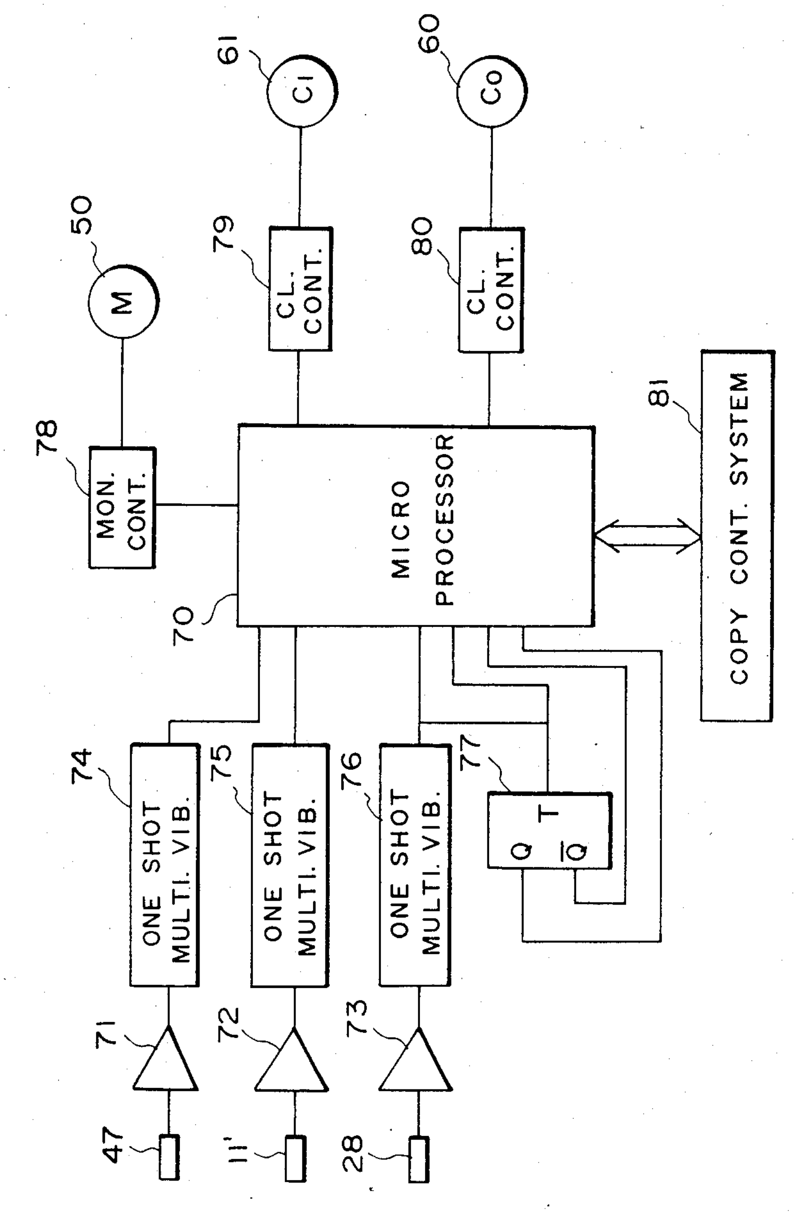
FIG. 5 is a block diagram of a control system for the FIG. 1 apparatus.

FIG. 5 is a block diagram of a control system used with the copying apparatus shown in FIGS. 1-4, with some parts thereof being omitted for the sake of simplicity. The same reference numerals as in FIGS. 1-4 are used for the elements in FIG. 5. The control system comprises amplifiers 71, 72 and 73 and one shot multivibrator 74, 75 and 76, among which the one shot multivibrators 75 and 76 each produce a single pulse upon the trailing edge of the input pulse. The system further includes a T-flip-flop means 77. The outputs of those multi-vibrators 74, 75 and 76 are connected to the inputs of a control circuit, which may be, for example, a micro-processor.

A motor driving circuit 78 is provided to drive the motor 50 is response to the output of the control circuit 70. The clutches which have been described hereinbefore are controlled by clutch control circuits 79 and 80 in their respective engaging and disengaging operations in response to the output of the control circuit 70. The control circuit 70 also controls a control system for the copying assembly B, which may be of known structure so that detailed explanation thereof is omitted for the sake of simplicity. The control circuit 70 is properly connected to the other parts of the original feeder A which are to be controlled, for example, to driving mechanisms for the switching element 7′ and the switch-back mechanism 10. For the sake of simplicity of explanation, these are omitted.

Figure 6:
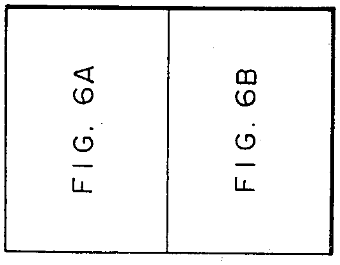
FIGS. 6A, 6B and 7A, 7B are flow charts of a method according to the embodiment of the present invention.
Figure 6A:
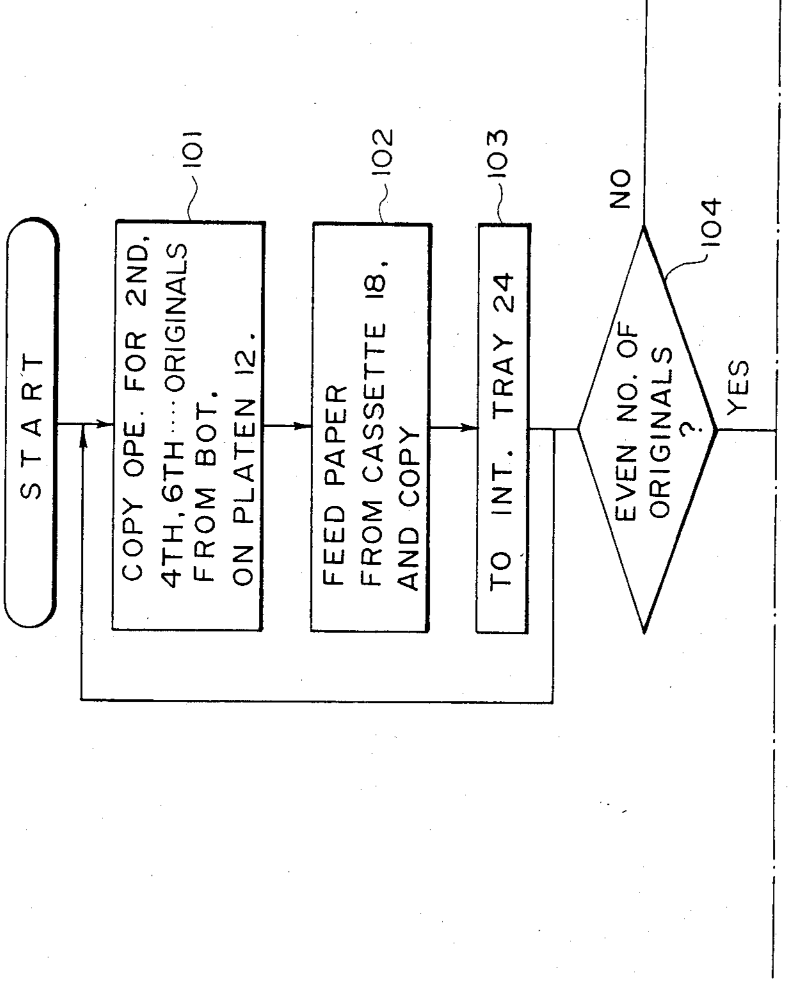
Figure 6B:
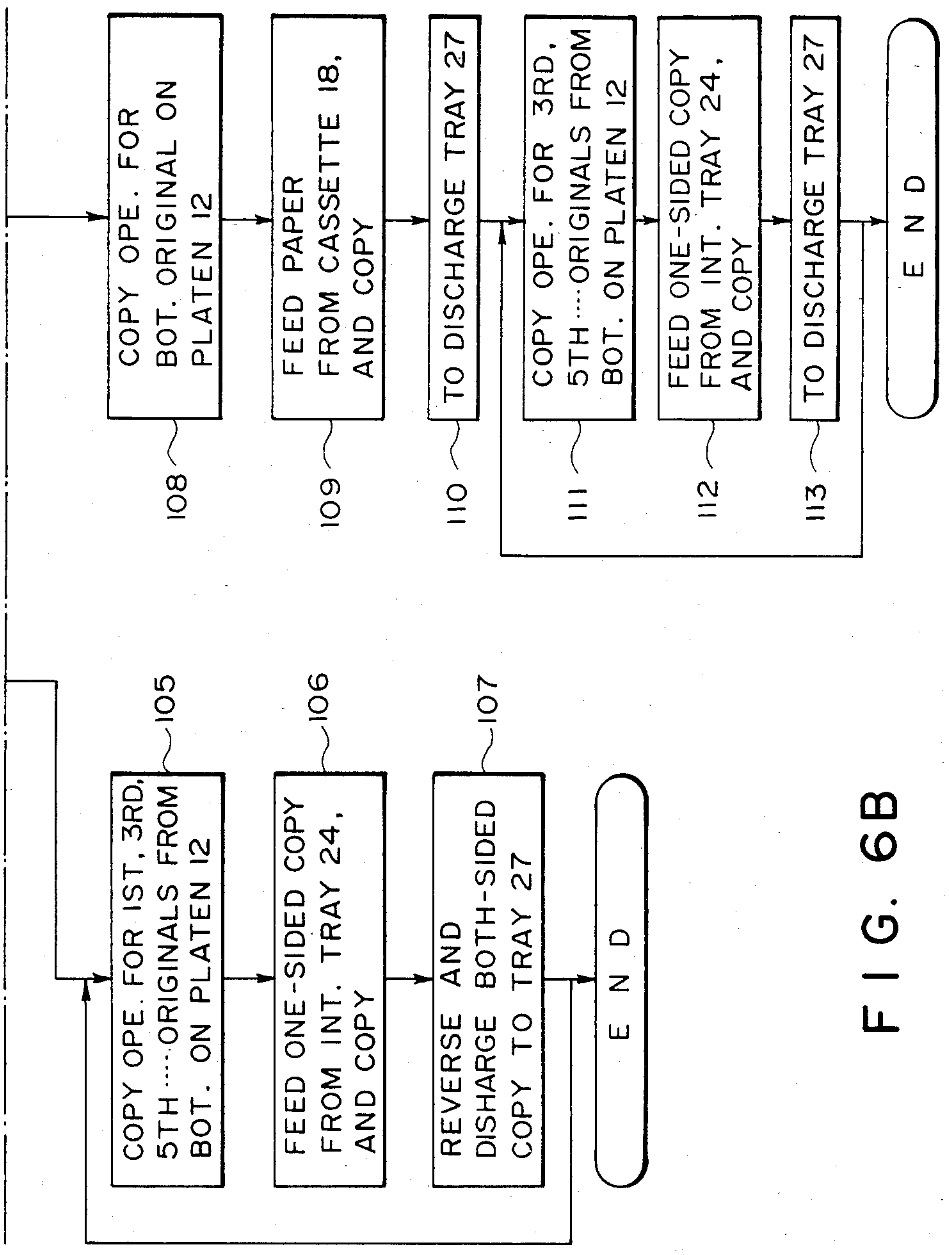

FIG. 6 is a flow chart showing control and operation of the apparatus which has been described in the foregoing paragraphs.

The method of producing a duplex copy will now be described in conjunction FIGS. 1-6.

On the original table 1, a stack of simplex sheet originals (not shown) are placed front surface up. The originals are stacked in the order of page number, and the top is page 1. Upon copy instructions, the photosensitive drum 16 rotates in the direction of the arrow (FIG. 1), and the motor 50 rotates forward. The motor 50 moves or rotates various elements of the original feeder A in the directions shown by solid line arrows in FIGS. 1 and 4. More particularly, the separation roller 4 is rotated in the clockwise direction by the motor 50 through the belt 54, pulley 53 and clutch 61 to rotate the separation belt 5 in the direction of arrow D. The feed roller 2 is rotated in the counterclockwise direction to rotate the feeding belt 3 in the direction of arrow C. By this, the partition plates 34a and 34b are placed to the original stack, as will be described in detail hereinafter, at the first original feed cycle, and the bottommost original of the original stack is fed into the first original path Ia by the feeding belt 3 and the separation belt 5. The forward driving force of the motor 50 rotates the conveying roller 6 in the counterclockwise direction in FIG. 4, i.e., in the clockwise direction in FIG. 1, through the belt 54, pulley 53, belt 55 and pulley 56.

The forward driving force of the motor 50 also drives, through the pulley 51 and clutch 60, the conveying belt driving roller 7 and drives it in the counterclockwise direction in FIG. 1 to move the conveying belt 8 in the direction of arrow C'. Thus, the bottommost original fed into the first original path Ia is reversed and conveyed by the conveyor roller 6 and roll **6*a* toward the conveying belt driving roller 7. At this time, the diversion gate 7*b* takes the position of connecting the first original path Ia and the second original path IIa (the position shown in FIG. 1), so that the bottommost original is conveyed by the conveying belt 8 in the second path IIa in the direction of arrow C'. When the photodetector 28 detects the trailing edge of the bottommost original (here, the trailing edge of an original is the trailing side edge in the direction of the movement of the original), the clutch 60 disengages after a short delay predetermined by presetting clock pulses, so that the driving roller 7, and therefore, the belt 8 stop to rest the bottommost original at a copying position on the platen glass 12**.

After the image of the bottommost original is copied, or without it being copied (this occurs, since the copy is taken for every other original, which will become clear in the subsequent descriptions), the clutch 61 is engaged, again. But, the direction of rotation of the driving roller 7 is opposite, namely, the driving roller 7 rotates in the direction shown by the broken line arrow. At this time, the diversion vane or gate assumes the same position as before, and therefore, the second original path IIa and the seventh original path VIIa are connected. Also, the motor 50 still rotates forward, which rotates the conveying roller 6 in the clockwise direction in FIG. 2. In the switch-back mechanism 10, the roll b in contacted to the driving roller 10. The driving roller 10 is rotated counterclockwise in FIG. 4, i.e., clockwise in FIG. 1 through the pulley 59, the belt 58 and the pulley 56. The pulley 56, which is integral with the conveying roller 6, is driven by the motor 50 in the counterclockwise direction in FIG. 4. The discharge roller **11*a* receives the forward driving force of the motor 50 via the pulley 51, belt 54 and pulley 52, to rotate counterclockwise in FIG. 4, i.e., clockwise in FIG. 1. Since the conveying belt driving roller 7 rotates in the direction of the arrow of broken line to move the conveying belt 8 in the direction opposite to that of arrow C', the original on the platen glass 12** is fed back from the second path IIa to the seventh path VIIa.

The original is then fed to the sixth original path VIa by the conveying roller 6, roll **6*b* and switch-back mechanism 10, and then discharged through the sixth path VIa by the discharge rollers 11 and 11*a* rightwardly in FIG. 1 to be stacked back on the topmost of the original stack. It should be noted here that this is the bottommost original, and therefore, it is placed on the topmost sheet with the partition plates 34*a* and 34*b*** therebetween.

The clutch 61 for driving the separation roller 4 and the feed roller 2 disengages with a predetermined delay after its engagement, more particularly with a delay determined by a predetermined number of clock pulses counted. That is, after the bottommost original of the original stack is completely fed, the clutch 61 disengages to stop the separation roller 4 and the feeding roller 2, thus standing by for the next original. When the photodetector 11' detects the trailing edge of the original which is being discharged, the clutch 61 engages again, if further original feeding operation is needed, to rotate the separation roller 4 and the feed roller 2 and move the separation belt 5 in the direction of arrow D, and the feeding belt 3 in the direction of arrow C, thus resuming the original feed. This is repeated so that the originals are sequentially fed to the copying position and then returned to the original table 1, that is, they are circulated.

The control operation for the above-described operation will be described in more detail. Upon the copy instructions, the control circuit 70 causes the motor 50 to rotate forward through the motor driving circuit 78. Then, the control circuit 70 places the clutches 61 and 60 into engaging position through the clutch control circuits 79 and 80. The clutch 60 establishes a driving engagement to rotate the driving roller 7 in the forward direction, i.e., counterclockwise in FIG. 1.

The clutch 61 is disengaged with a predetermined delay. The control circuit 70 counts the clock pulses after it causes, through the clutch control circuit 79, the clutch 61 to engage. When a predetermined number of the clock pulses (i.e., a predetermined time period) is counted, and therefore, the bottommost original on the original table 1 has been fed, the control circuit 70 disengages the clutch 61 through the clutch control circuit 79 so that the clutch 61 is prepared for the next original.

When the photodetector 28 detects the trailing edge of the original, the detection signal is supplied through the amplifier to the one shot multi-vibrator 76, which produces one pulse in response to the trailing edge of the detection signal. The pulse of the multi-vibrator 76 is received by the control circuit 70, which starts to count the clock pulses. When a predetermined number of the clock pulses is counted, that is, when a predetermined short period of time has passed after the photodetector 28 detects the trailing edge of the original, the control circuit 70 disengages the clutch 60 through the clutch control circuit 80. By this, an original is placed on the platen glass 12.

If the original is to be copied, the control circuit 70 controls the copy control system 81 so that a copy image is produced.

In the case where the copy instruction is that of one sided copy, the T-flip-flop 77 is set to a certain initial state, immediately after the copy instructions, that is, the state of high level at the Q output of the T-flip-flop 77. If the T-flip-flop 77 is set to the high level at the output $\overline{Q}$, a pulse is given thereto by the control circuit 70 so that the initial state, i.e., high at Q output is established. Then, the T-flip-flop 77 receives the pulses, for each of the fed originals, from the one shot multi-vibrator 76.

After the original placed on the platen glass 12 is copied, or without it being copied, as the case may be, the control circuit 70 engages the clutch 60 through the clutch control circuit 80. At this time, the clutch 60 engages to rotate the conveying belt driving roller 7 in the reverse direction, i.e., in the clockwise in FIG. 1. While the original is being fed back, that is, circulated and discharged, the photodetector 11' produces, in response to the original trailing edge, a pulse, whose trailing edge is transmitted through the amplifier 72 to the one shot multi-vibrator 7. After this, the control circuit 70 engages the clutch 61 to start the next original feed, and immediately thereafter, change the engagement of the clutch 60 to drive forward the conveying belt roller 7.

The above described steps are repeated to produce a copy image. If the copy instruction is for the first side copy in the first cycle for the stack of originals, the photosensor 47 transmits its output to the control circuit. 70 through the amplifier 71 and the one shot multivibrator 74, after the termination of the first cycle for the set of the originals. In response thereto, the control circuit 70 detects the state of the T-flip-flop 77 output to discriminate whether the number of the originals in the stack is even or whether it is odd. This is accomplished because, if the Q output of the T-flip-flop 77 is detected, the number is even, whereas, if $\overline{Q}$ output is detected, it is odd, due to the initial setting of the T-flip-flop 77, which has been described hereinbefore.

The output state of the T-flip-flop 77 may also be used for discriminating whether an original which is being copied is an even number page of the original, as counted from the bottommost original, or whether it is an odd number page. This is accomplished by the control circuit 70 detecting the output state of the T-flip-flop 77 after the original is detected by the photosensor 28 to produce a pulse in the multi-vibrator 76 and then positioned in place on the platen glass 12. The control circuit 70 controls the copy control system 81, as desired, in dependence upon whether an even number page of the originals is placed on the platen glass 12, or whether an odd number page is thereon.

Next, the duplex copy operations will be described on the assumption, for example, that the 2nd, 4th, 6th . . . of the stack of the originals, as counted from the bottom, are firstly copied on one sides of copy sheets, in conjunction with FIGS. 1–6. First, the information that the even number pages are to be firstly copied is inputted to the control circuit 70, although this information may be previously stored in the control circuit 70. Upon the copy instructions, the bottommost, i.e., the first original is fed through the first original path Ia and the second original path IIa to the platen glass 12, then, without delay, discharged back, through the seventh original path VIIa and the sixth original path VIa, to the original table 1, finally by the discharge rollers 11 and 11*a*. The discharged original is face up, the same as before. No copy operation is performed, to the first original, by the copying assembly B. Next, the second, as counted from the bottom, of course, is fed similarly through the first and second paths Ia and IIa to the platen glass 12 (101). Each time an original is fed, the T-flip-flop 77 is actuated to reverse its output state. In the present, the Q output is at the high level. The control circuit 70 receiving this signal causes the copying assembly B to start copy operation through the copy control system 81. The scanning optical system 13 moves in the direction of the arrow to project an image of the original through a slit onto the photosensitive member 16 rotating in the direction of the arrow, at the image exposure station 13*g*.

The photosensitive member 16 is subjected to operations of the pre-exposure/charge-removal discharger 14*a*, the primary charger 14*b*, the discharger 14*c* and the whole surface exposure device, so that an electrostatic latent image is formed on the drum 16 surface. The latent image is visualized by the developing device 15 as a toner image.

On the other hand, the copy sheet fed out of the cassette 18 by the feeding roller 19, passes through the first copy sheet path Ib, and is fed to the image transfer station in timed relation with the developed image by the registration or register rollers 20 and 20*a*. The developed image, i.e., the toner image is transferred onto the copy sheet by the transfer discharger 14*d*. The copy sheet is separated from the photosensitive drum 16 and fed through the second copy sheet path IIb by the conveying belt 21 to the fixing station, where the toner image is fixed on the copy sheet by the image fixing rollers 22 and 22*a*, thus a one sided copy is produced (102). The diversion gate 34 is in its second position shown by phantom lines, while the switch-back mechanism 23 is in a position opposite to the shown one, namely, in such a position that the left side roller 23*c* and the roll b are contacted, while the driving roller (right side) 23*a* and the roll a are spaced apart. Therefore, the one sided copy, that is, the copy sheet having a copied image only on its one side, is passed through the third copy sheet path IIIb, the switch back mechanism 23 and the fourth copy sheet path IVb. Then, it is accommodated on the interim tray 24 (103), face up, i.e., the copied side faces upwardly.

The trailing edge stopper 24*a* of the interim tray 24 is at the position shown by reference character X, so that the accommodated copy sheet does not contact the re-feeding rollers 25 and 25*a*. Therefore, the accommodated copy sheet is not re-fed.

The original existing on the platen glass 12, which is the second from the bottom, is returned, after termination of copy operation thereto or after termination of scanning operation thereto, through the seventh original path VIIa and the sixth original path VIa and discharged by the discharge rollers 11 and 11*a* to the topmost of the original stack on the original table 1, in the manner described hereinbefore.

The next original, which is the third from the bottom, is then fed to the platen glass 12 in the manner as described with respect to the bottom page and changes the state of T-flip-flop 77 output. The copying assembly B does not perform the copying operation for this original, so that the original is returned to the original table 1 without delay, as for the bottom or first original. These steps are repeated for all of the originals placed on the original table 1. When these operations are complete, the interim tray 24 stacks one sided copies. This is the termination of the first cycle of original feed.

Before going into the second original feed cycle, the explanation will be made as to what happens at the time of the feeding of the last original, i.e., the topmost original, in the last part of the first original feeding cycle, referring to FIGS. 2 and 3. As described hereinbefore, the partition plates 34*a* and 34*b* are placed on the topmost original. After the topmost original is fed out from the original table 1, the partition plates 34*a* and 34*b* contact the feed belt 3 (3*a* and 3*b*) and are rotated in the directions of arrow E by the friction therebetween. They are rested at a position shown by the phantom lines by the spring 36. Since the partition arms 35*a* and 35*b* are urged by the friction plates 37 and 37*a* in the direction of arrow G, they rotate in the direction of arrow G as soon as the partition plates 34*a and 34b* are collapsed. When the trailing edge of the original is detected by the photosensor 47, the feeding rollers 2 and 2*a* and the separation rollers 4 and 4*a* are stopped, so that the partition plate arms 35*a* and 35*b* are rested at the positions shown by the broken lines, after the last original, i.e., the topmost original is fed out. When the feeding of the topmost original, and therefore, the partition plate arms 35 and 35*a* are detected by the photosensor 47, the feeding rollers 2 and 2*a* and the separation rollers 3 and 3*a* are kept rested, and started to rotate at the first original in the second cycle, so that the partition plates 34*a* and 34*b* are placed on the topmost original.

When the stack of the originals is placed on the original table 1 prior to the copy instructions, the partition plates 34*a* and 34*b* rotate in the direction of arrow G in response to the copy instructions in the same manner, as described above, to be placed on the topmost original.

After a full set of one sided copies is produced in the first cycle of the original feed, the one sided copies are ready to be subjected to additional copy operations at their back side (the side not bearing any images). Now that the first cycle has been completed, it is known from the state of T-flip-flop 77 output whether the total number of the originals is odd or even, as explained hereinbefore. Therefore, the operation mode of the second cycle is automatically set to be an odd-number mode or an even-number mode, in response to the state of the T-flip-flop 77.

After the copy instruction, the control circuit 70 fetches the state of T-flip-flop 77 output (104), when it receives the second pulse through the one shot multivibrator 74 and the amplifier 71 from the photosensor 74, that is, when the first cycle of the original feed completes. If the Q output of the T-flip-flop 77 is at the high level, that is, if the even-number mode is to be selected, the copying assembly B effects copy operations for the first, third, fifth . . . originals, as counted from the bottom. When the first, i.e., the bottommost original is fed to the platen glass 12 through the first and second original paths Ia and IIa (105), the control circuit, which has been supplied with the high level $\overline{Q}$ output of the T-flip-flop of 77, controls the copy operation control system 81 to perform the copy operation for the second side copy. The trailing edge stopper 24*a* of the interim tray 24 moves from the X position to Y position, as shown in FIG. 1, whereby the one sided copy sheets on the interim tray 24 is moved toward the re-feeding rollers 25 and 25*a*, which rotate and feed the bottommost sheet out to the register rollers 20 and 20*a* through the fifth copy sheet path Vb and the sixth copy sheet path VIb.

Similarly to the first cycle, a toner image of the original placed on the platen glass 12 is formed on the photosensitive drum 16 and, then, transferred by the transfer discharger 14*d* onto the back (second) side of the one-sided copy sheet which is fed to the transfer station by the register roller 20 and 20*a*. The copy sheet is separated from the drum 16 with the aid of the separation discharger 14*e* and fed through the second copy sheet path IIb to the image fixing rollers 22 and 22*a*. Thus, a duplex copy having images at the respective sides thereof is produced (106). The diversion gate 34 is at the second state as shown by the chain lines, whereby the duplex copy sheet, having passed through the nip between the fixing rollers 22 and 22*a*, is passed through the third path IIIb and conveyed to the fourth path IVb by the switch-back mechanism 23.

When the trailing edge of the duplex copy is detected by the photodetector 32*a*, the switch-back mechanism 23 is switched to the state shown in the figure, that is, the roller 23*a* rotating in the counterclockwise direction contacts the upper roll a, while the lefthand roller 23*c* and the roll b are separated. Also, at this time, the diversion gate 34 is switched from the shown second position to the first position shown by broken lines. Since the third copy sheet path IIIb is closed, the duplex copy sheet fed to the diversion gate 34 by the switch-back mechanism 23, is conveyed through the fourth path IVb and the seventh path VIIb and finally discharged to the discharge tray 27 by the discharge rollers 26 and 26*a*. After this, the diversion gate vane 34 is switched to the second position, while the switch-back mechanism is reversed to the state of the roller 23*c* contacting the roll b, in the next copying process. This is effected by discharge the duplex copies to the tray 27 in correct page order.

The original on the platen glass 12 is conveyed back through the seventh original path VIIa and the sixth path VIa and discharged to the original table 1 by the discharge rollers 11 and 11*a*.

Next, the second, from the bottom, original is fed to the platen glass 12, but the copy operation is not effected as to this original by the copying assembly B.

Those steps are repeated for all of the stacked originals. The one sided copy sheets are all produced as duplex copies and discharged onto the discharge tray 27 in the order of pages (107).

The detection of the second cycle completion may be made by the control circuit 70 counting, during the second cycle, the pulses of the photodetector 28 and comparing the count with the final count of the first cycle, or by the signal from the photosensor 47, or by detecting by the photosensor 33 the trailing edge of the last one-sided copy sheet on the interim tray 24.

In the case of the odd-number mode being detected by the T-flip-flop 77 output state (104), the same copy operation is effected as in the even-number mode, but it is effected only to the first, third, fifth . . . originals as counted from the bottom of the originals. Before entering the second cycle original feed, the control circuit 70 supplies one pulse to the T-flip-flop 77 to render its Q output to be the high level.

When the first, i.e., bottommost original is fed from the original table 1 to the platen glass 12 by the original feeder A through the first and second original paths Ia and IIa (108), the output state of the T-flip-flop 77 is "high" at $\overline{Q}$ output, since one pulse is given from the photodetector 28. The control circuit 70, supplied with the output of the T-flip-flop 77, controls the copy control system 81 to perform a copy operation for a one sided copy.

The bottommost original in the second cycle is not copied on the one sided copy sheet, but copied on a fresh copy sheet fed out of the cassette 18, and then the resultant one sided copy is discharged directly to the tray 27 as a simplex copy. During this operation, the diversion gate 34 is at the first position shown by the broken line, and the third copy sheet path IIIb is closed, while the eighth path VIIIb is opened. Therefore, the one sided copy, after passing through the nip between the fixing rollers 22 and 22*a*, is conveyed through the eighth path VIIIb and discharged to the tray 27 by the discharge rollers 26 and 26*a*.

The original on the platen glass 12 is conveyed back through the seventh original path VIIa and the sixth original path VIa and returned onto the topmost of the stack of originals on the original table 1 by the discharge rollers 11 and 11*a*.

Next, the second, as counted from the bottom, original is fed to the platen glass 12. However, the copying assembly B does not perform the copy operation. When the original is fed, the photodetector 28 gives one pulse to the T-flip-flop 27 to change the Q output thereof to be high. The control circuit supplied with this output makes the copy control system 81 non-operative. The original on the platen glass 12 is conveyed back, by the background rotation of the conveyor belt driving roller, through the seventh original path VIIa and the sixth original path VIa, and finally discharged onto the currently topmost original on the original table 1 by the discharge rollers 11 and 11*a*.

Next, the third, as counted from the bottom original is fed onto the platen glass 12 through the first and second original paths Ia and IIa to be placed at the copy position (111). At this time, the $\overline{Q}$ output of the T-flip-flop 77 is at high level so that the control circuit 70 supplied with this output controls the copy control system 81 to effect the duplex copy. By this, the trailing edge stopper 24*a* of the interim tray 24 is moved from its X position to Y position to move forward the one sided copies on the interim tray 24 toward the re-feeding rollers 25 and 25*b*, which re-feed the bottommost one sided copy sheet, already having the image of the second original from the bottom on the first side thereof, toward the register rollers 20 and 20*a* through the fifth and sixth copy sheet paths Vb and VIb.

Similarly to the first cycle of the original feed, a toner image of the original on the platen glass 12 is formed on the photosensitive drum 16. The toner image is transferred by the transfer discharger 14*d* onto the second side, that is, the non-image bearing side, of the one sided copy sheet fed by the register rollers 20 and 20*a*. The copy sheet is separated from the drum 16 by the separation discharger 14*e* and conveyed to the fixing rollers 22 and 22*a*, which fix the toner image. Thus, a duplex copy is produced (112). The duplex copy is discharged to the discharge tray 27 by the discharge rollers 26 and 26*a* (113).

The original on the platen glass 12 is discharged in the same manner as described above.

Subsequently, the same operations as for the second original from the bottom, are effected for the 4th, 6th . . . originals, while the same operations as for the 3rd original are effected for the 5th, 7th originals (111, 112 and 113) until all the originals are treated, so that the second cycle completes. The operations after the end of the original feed of the second cycle are the same as those explained with respect to the even number mode.

Thus, there are duplex copies on the tray 27 which are in the order of the pages. The detection of the termination of the second cycle may be made in the same manner as with the even number mode.

Figure 7:
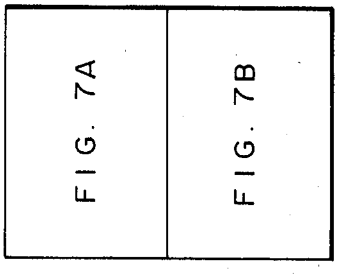
Figure 7A:
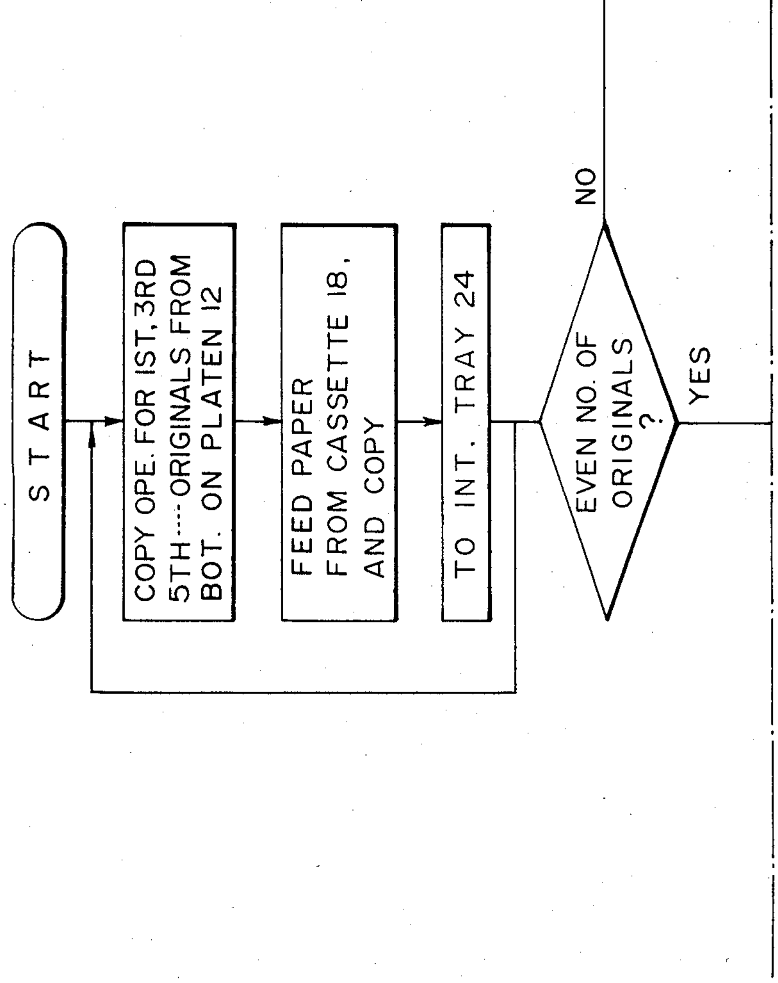

FIG. 7 is a flow chart of the sequential operations when the odd number pages are first copied to produce one sided copies, whereafter the even number pages are copied on the one sided copy sheets to produce duplex copies. As shown in this Figure, in the second cycle, if it is in the even number mode, the switch-back mechanism 23 is not used so that the copy sheet is discharged directly from the fixing rollers 22 and 22*a* through the eighth path VIIIb to the tray 27 by the discharger rollers 26 and 26*a*. In the second cycle, if it is in the odd-number mode, the one sided copy sheet having the image of the bottommost original on its first side is conveyed from the interim tray 24 through sixth path VIb and second path IIb through the idle scan, and then reversed by the switch-back mechanism 23 so that it is discharged to the tray 27 with the copied side up. The subsequent one sided copies on the interim tray 24 are reversed and discharged in the same manner as above with the use of the switch back mechanism after forming the second side copies. The detail explanation of the other part of the flow chart is omitted for the sake of simplicity, because it is readily understood together with the foregoing description of the operations.

Figure 8A:
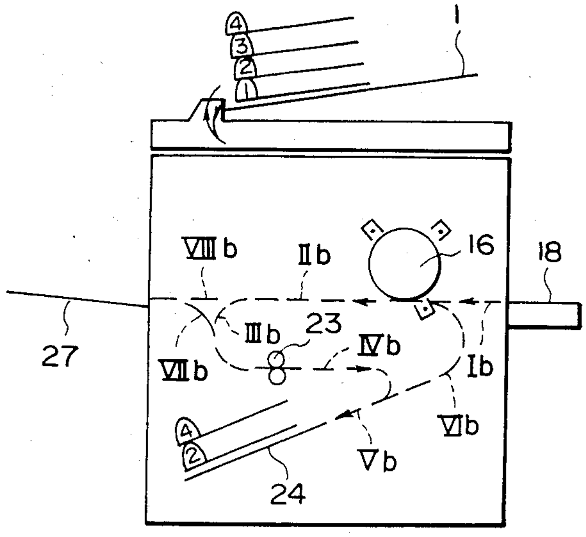
FIGS. 8A, 8B, 9A, 9B and 9C are schematic illustrations of the flow of originals in the method and apparatus of FIG. 6.
Figure 8B:
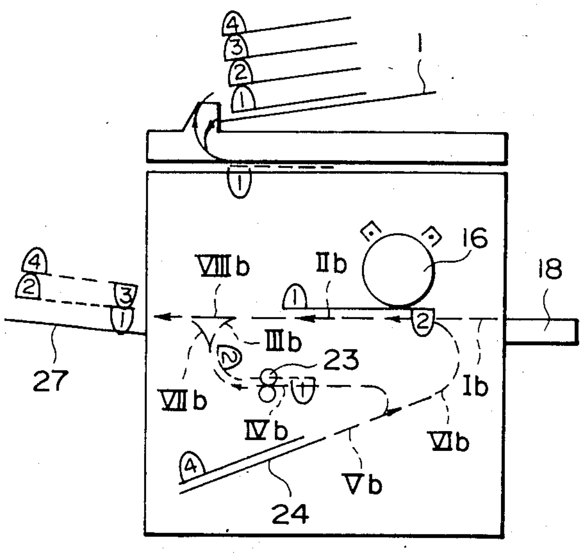
Figure 9A:
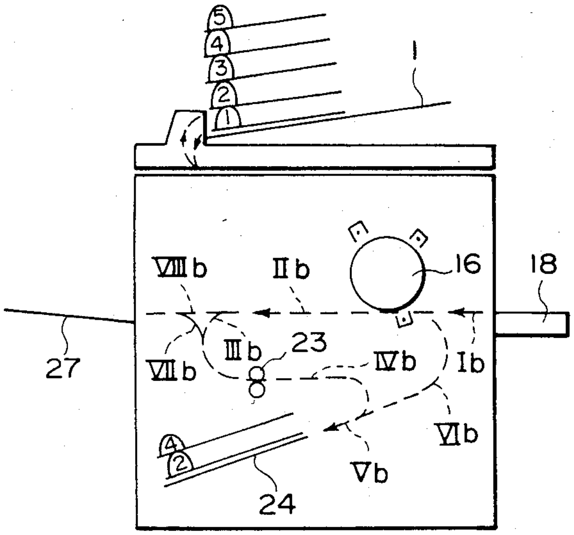
Figure 9B:
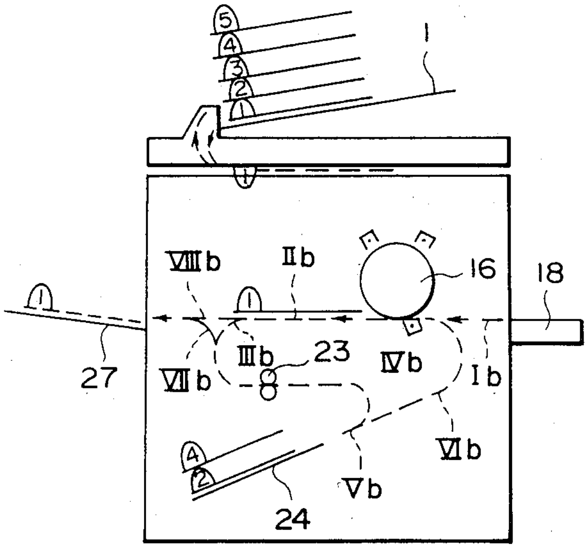
Figure 9C:
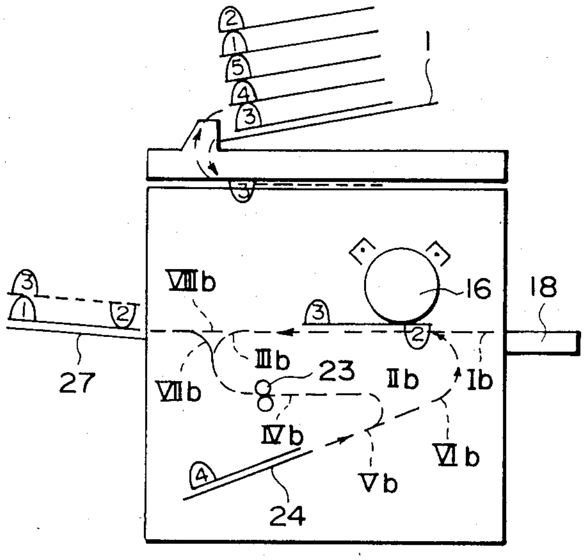
Figure 10A:
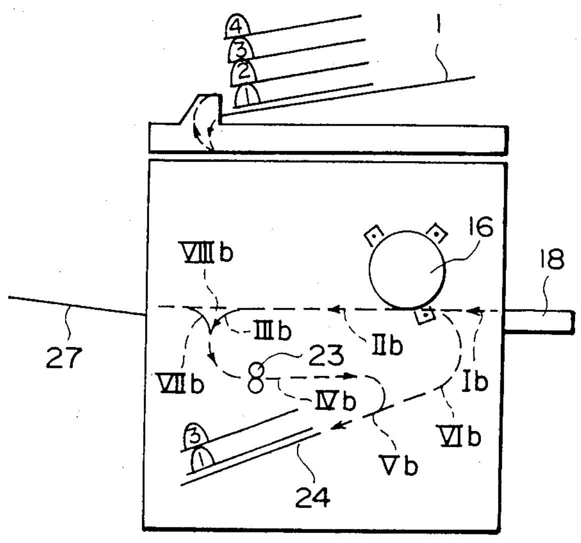
FIGS. 10A, 10B, 11A, 11B and 11C are schematic illustrations of the flow of originals in the method and apparatus of FIG. 7.
Figure 10B:
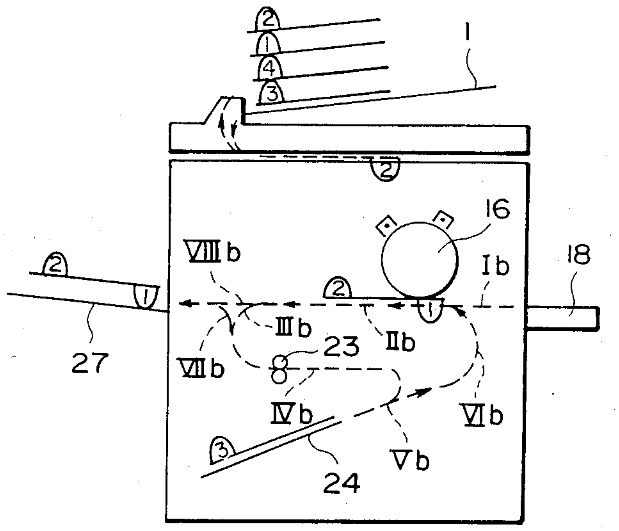
Figure 11A:
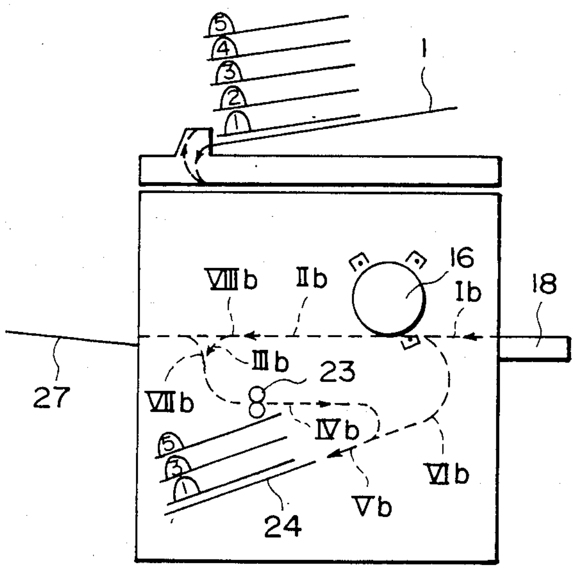
Figure 11B:
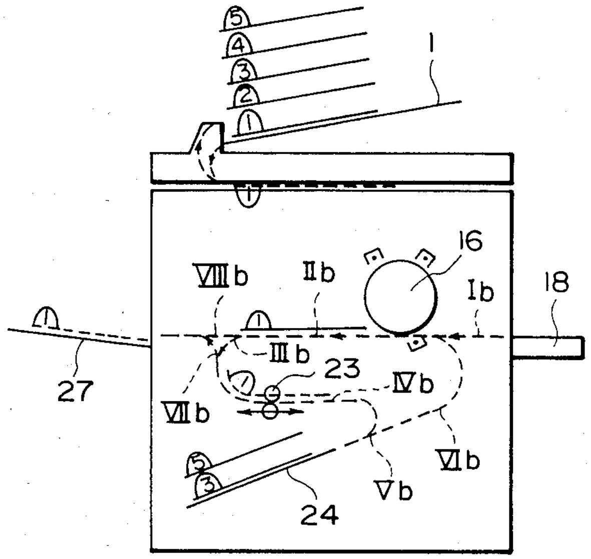
Figure 11C:
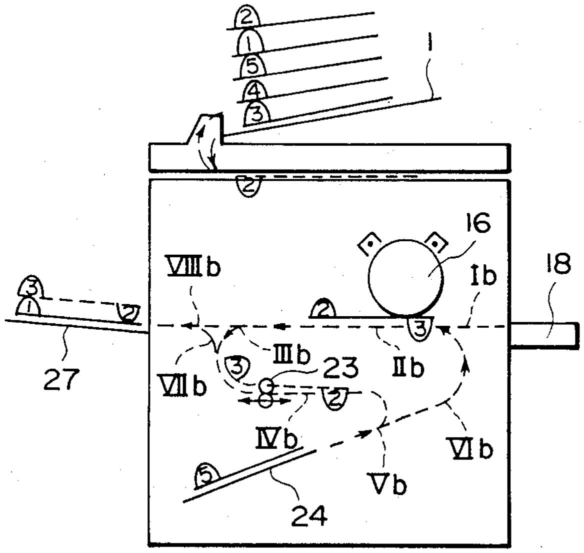

FIGS. 8A, 8B, 9A, 9B, 9C, 10A, 10B, 11A, 11B and 11C illustrate operations of the apparatus according to the present embodiment. FIGS. 8A and 8B show them when an even number of originals are placed on the original table 1, and in the case where the even number pages, from the bottom, are copied first, and then the odd number pages are copied in the second cycle. FIGS. 9A, 9B and 9C deal with the same case, but when an odd number of originals are placed on the table 1. FIGS. 10A and 10B show the operations when an even number of originals are placed on the original table 1, and in the case where the odd number pages are copied in the first cycle, and then the even number pages are copied in the second cycle. FIGS. 11A, 11B and 11C deal with the same case, but when an odd number of originals are placed on the original table 1. In FIGS. 8–11, the numerals given to the originals on the original table 1 is the number of pages, as counted from the bottom of the original stack. The numerals are placed on such a side of an original that bears the image. A copy sheet having a numeral bears the image of the original of the corresponding page. The copy image is formed on the side having the numeral. Those Figures will be readily understood together with the explanations made hereinbefore, and therefore, detailed explanations are omitted for the sake of simplicity.

Figure 12A:
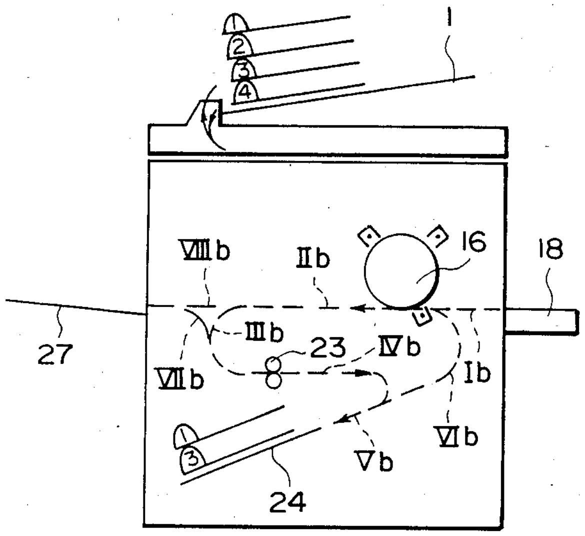
FIGS. 12A, 12B, 13A, 13B, 13C, 14A, 14B, 15A, 15B and 15C are schematic illustration of the flow of originals in the apparatus and method of FIG. 1, which show the pages of originals and copies.
Figure 12B:
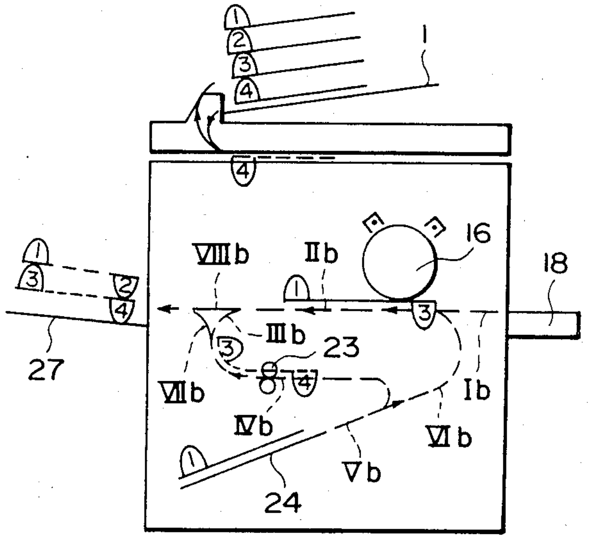
Figure 13A:
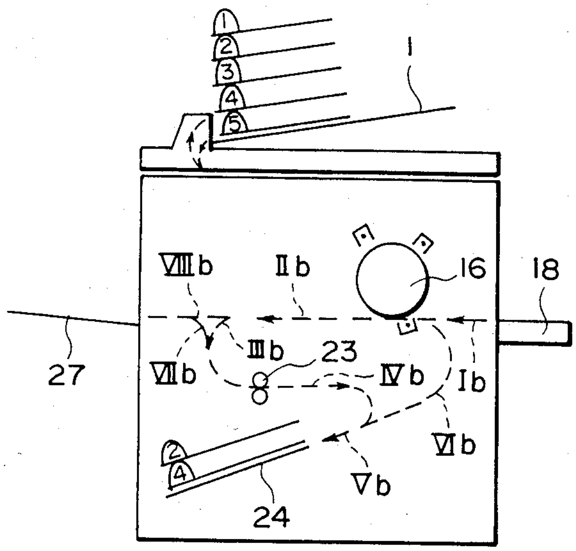
Figure 13B:
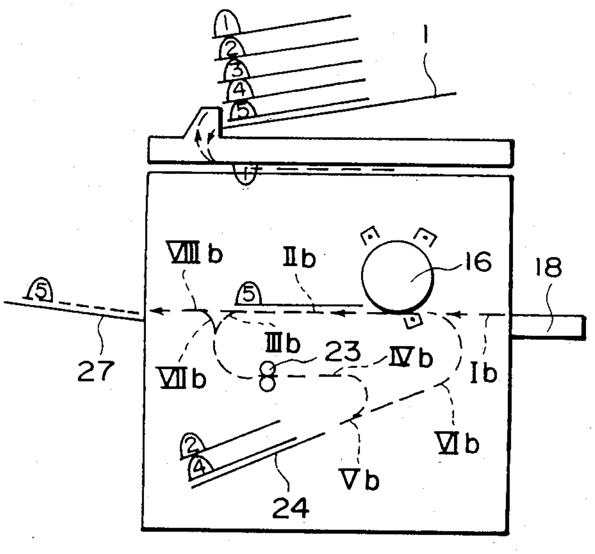
Figure 13C:
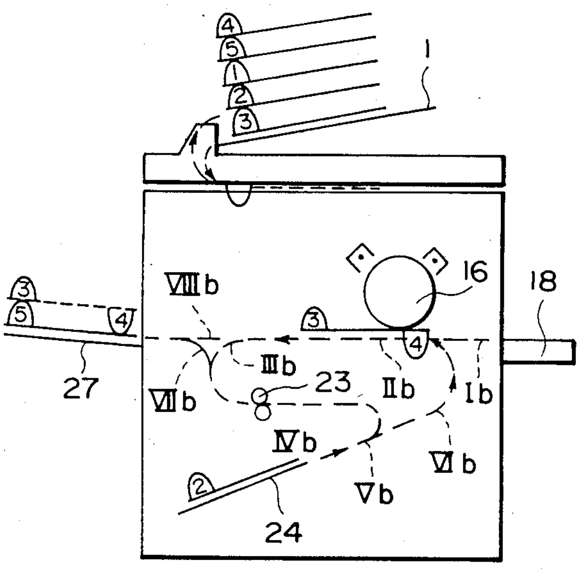
Figure 14A:
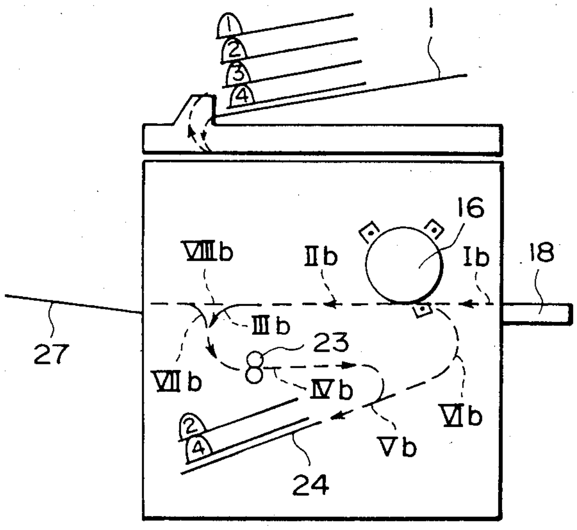
Figure 14B:
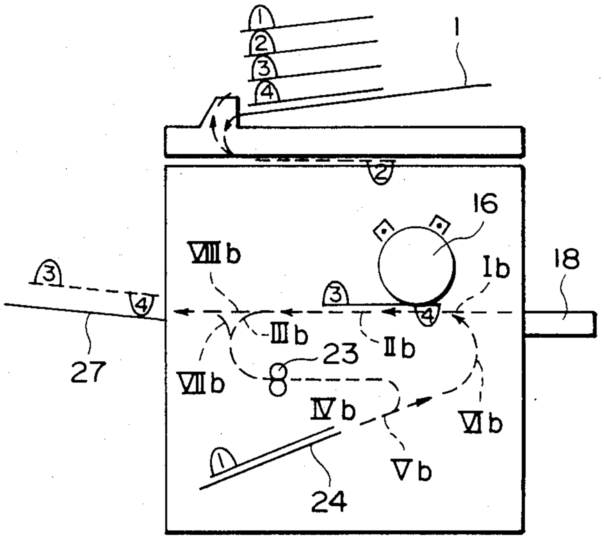
Figure 15A:
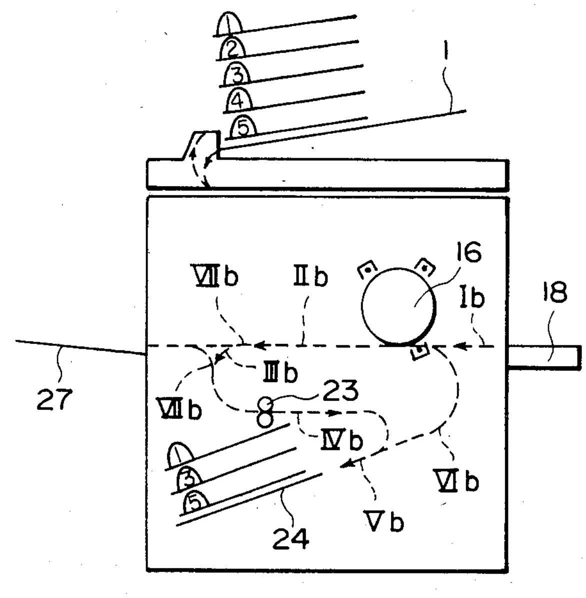
Figure 15B:
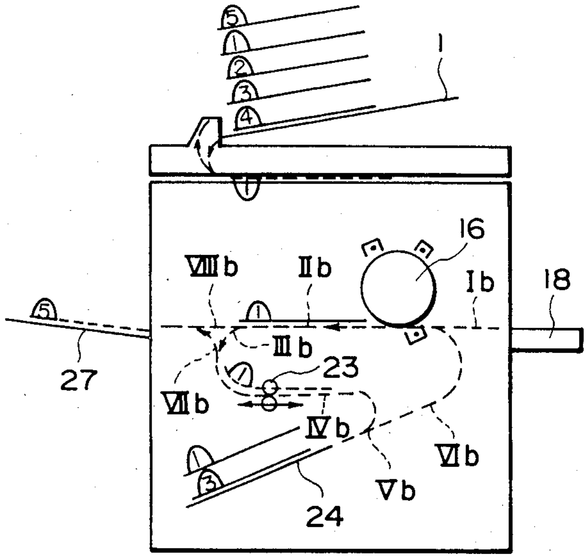
Figure 15C:
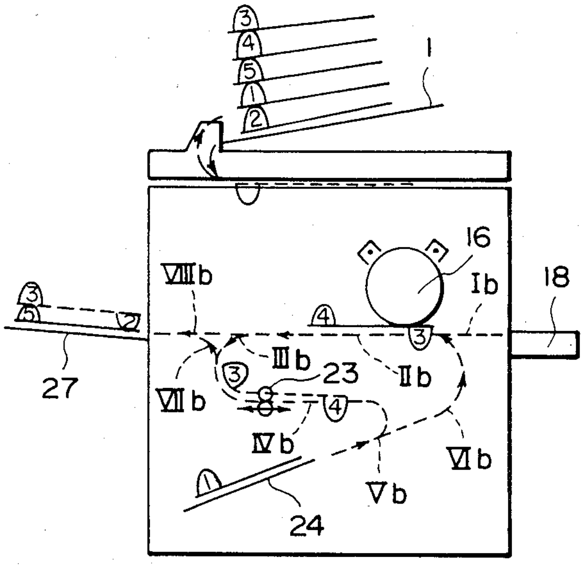
Figure 16:
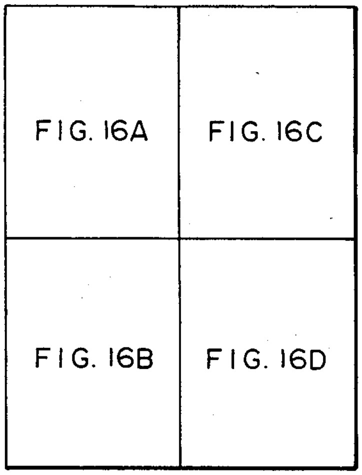
FIGS. 16A, 16B, 16C and 16D are a flow chart of a method according to a further embodiment of the present invention.
Figure 16C:
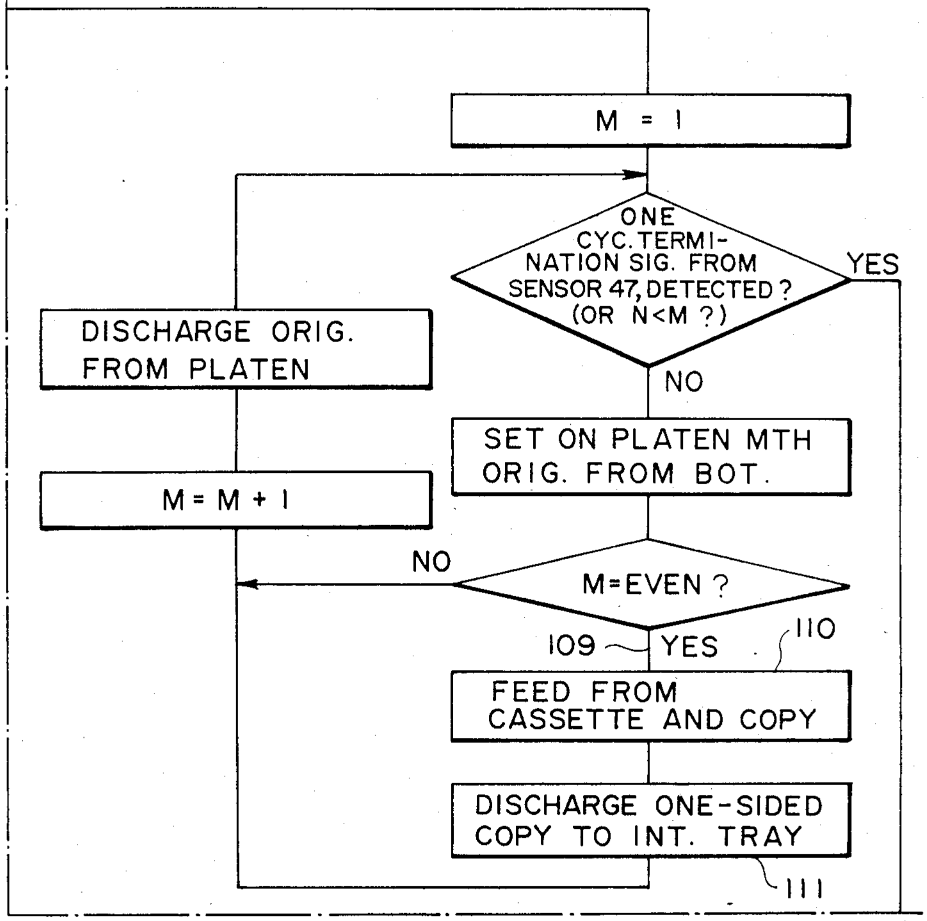
Figure 16A:
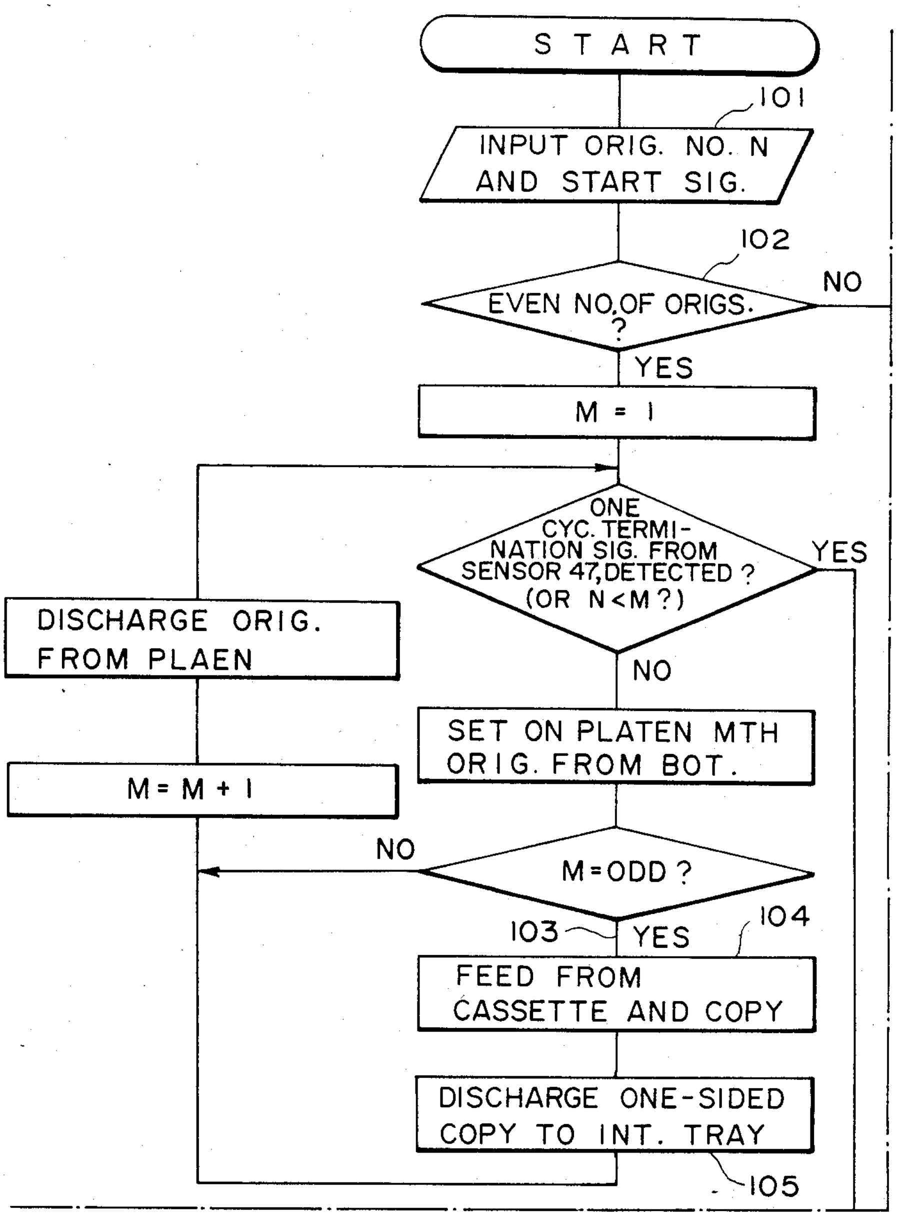
Figure 16B:
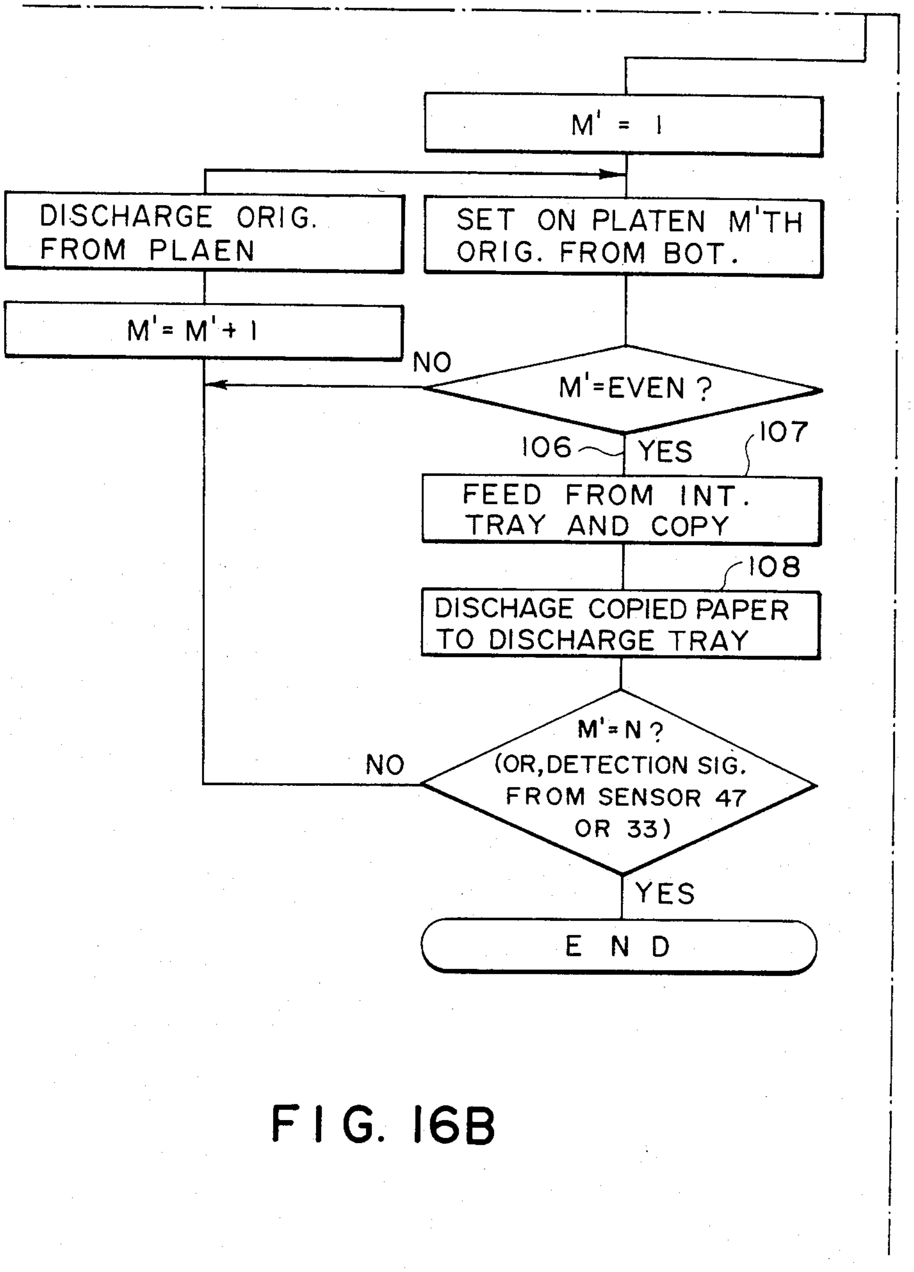
Figure 16D:
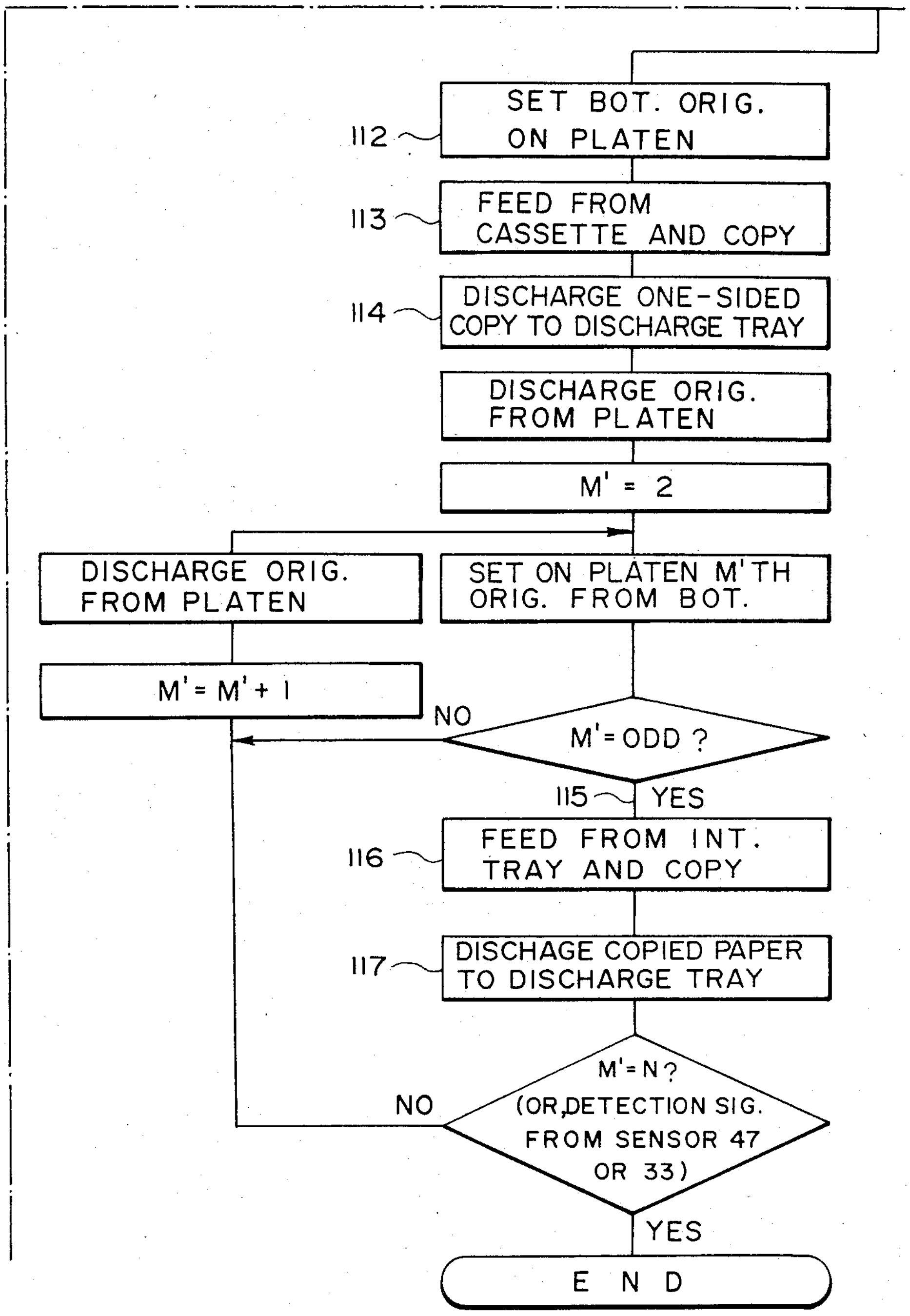

FIGS. 12A, 12B, 13A, 13B, 13C, 14A, 14B, 15A, 15B and 15C illustrate the same operations, but the originals are given the page numbers, not the number as counted from the bottom. FIGS. 12A and 12B show the operations when an even number of originals are placed on the original table 1, and in the case where the even number pages, from the bottom, are copied first, and then the odd number pages are copied in the second cycle. FIGS. 13A, 13B and 13C deal with the same case, but when an odd number of originals are placed on the table 1. FIGS. 14A and 14B show the operations when an even number of originals are placed on the original table 1, and in the case where the odd number pages are copied in the first cycle, and then the even number pages are copied in the second cycle. FIGS. 15A, 15B and 15C deal with the same case, but when an odd number of originals are placed on the original table 1. Therefore, FIGS. 12A, 12B, 13A, 13B, 13C, 14A, 14B, 15A, 15B and 15C correspond respectively to FIGS. 8A, 8B, 9A, 9B, 9C, 10A, 10B, 11A, 11B and 11C. But, it will be more readily understood that the orientation and the order of the discharged duplex copy sheets are in proper states with these Figures.

When two or more sets of copies are needed, a sorter is used in place of the discharge tray 27. The number of the necessary sets is given to the control circuit 70 prior to the copy instructions by an unshown means. Then, the scanning optical system 13 scans the original placed on the platen glass 12 the set number of times to provide the number of one sided copies in the first cycle and the number of duplex copies in the second cycle. When the duplex copies are discharged, they are sorted by the sorter, rather than simply discharged to the tray 27. The detailed explanation is omitted in this respect for the sake of simplicity, because it is self-explanatory.

In the foregoing embodiment, the even-number mode and the odd-number mode are selected on the basis of the output of the T-flip-flop 77. They may be selected, however, by simply counting the pulses of the photodetector 28 by the control circuit 70, which can discriminate on the basis of the count after the termination of the first cycle. This alternative does not use, for the discrimination, the T-flip-flop 77.

As described above, according to the present invention, duplex copies can be discharged in the correct page orders, and can be read through as they are, without the need of previously setting the number of the originals. Also, the number of the originals can be detected at the end of the first cycle of the original feed, so that no additional original feeding operation exclusively for counting the number of originals is required, thus avoiding additional damage to the originals and also decreasing the cost of the apparatus.

By the original feeder A, it is possible to produce duplex copies from duplex originals. This will be explained here. It is assumed that duplex originals are stacked on the original table 1 in the order of their pages, that is, the first page on the top. The bottommost original fed to the platen glass 12 is not copied as it is, but conveyed back by the switch-back mechanism 9 having the roller 9*a* and roll b contacted at this time, until the trailing edge thereof is sensed by the sensor 29. Then, the switch-back mechanism 9 is switched so that the roller 9*a* contacts the roll a to feed the original to the fifth original path Va and sixth original path VIa. After the trailing edge thereof passes by the sensor 30, the original is again reversed and fed to the platen glass 12. Thus, the back side of the original, that is, the side having a larger page number, is faced down, and is copied. The operation is separated to copy the front side of the same original. Then, the original is fed back through the seventh and sixth original paths VIIa and VIa to be discharged to the topmost of the original stack on the original table 1. Thus, a duplex copy is produced from a duplex original. Those operations are repeated for the remaining originals.

FIGS. 16–19 illustrate a further embodiment of the present invention. In this embodiment, it is previously known whether the number of the original is odd or even. The method of counting the number is not limited, and it may be that an operator has counted the number, that the originals are fed idle (i.e., without copying operation) by the original feeder A to make it count the number thereof, or that a counting lever is used while the originals are placed on the original table 1.

In this embodiment, simplex copies are placed on the original table 1, which are faced up in the order of the page, i.e., the first page on the top, similarly to the foregoing embodiment. The total number of the originals is inputted to the control circuit 70 by an operator. The control circuit 70 discriminates whether it is odd or even. If the discrimination is made by an automatic original feeder or counting lever, the count thereof may be automatically inputted to the control circuit 70.

It is assumed that the number of the originals is odd and that the second, fourth, sixth . . . originals from the bottom are first copied. Firstly, the information that an odd number of originals are placed on the table 1 is given to the control circuit 70 by unshown means (101), so that the control circuit discriminates that the number of originals is odd (102). As in the foregoing embodiment, the originals are sequentially fed to the platen glass 12, and even number pages of originals are copied by the copying assembly B (110, 111) to produce one sides copies.

After completion of the feed of all originals, that is, after completion of the first cycle of original feed, the uncopied originals are copied on the other side of the one sided copy sheets.

After the copy instruction, the second cycle original feed is started, when it receives the second pulse through the one shot multi-vibrator 74 and the amplifier 71 from the photosensor 47. The copying assembly B effects copy operations for the first, third, fifth . . . originals, as counted from the bottom. When the first, i.e., the bottommost original is fed to the platen glass 12 through the first and second original paths Ia and IIa (112), the control circuit controls the copy operation control system 81 to keep the copy operation as one-sided copy mode, so that the first original is copied on a blank copy sheet fed from the cassette 18 by a known or described copy process (113), and then, the one sided copy sheet is discharged out directly to the discharge tray (114). After the first original is copied, the original on the platen glass 12 is conveyed through the seventh original path VIIa and the sixth original path VIa and discharged to the original table 1.

Next, the second, from the bottom, original is fed to the platen glass 12 by the automatic original feeder A through the first path Ia and the second path IIa. But, the control circuit 70 determines, from the pulse by the photodetector 28, that this original is the second original as counted from the start of the second cycle, so that it prevents the copy control system 81 from performing a copy operation. Rather, it allows the original to return to the original table 1.

Next, the third original, counted from the bottom is fed onto the platen glass 12 through the first and second original paths Ia and IIa to be placed at the copy position (115). At this time, the original is the odd-number original (not first) as counted from the start of the second cycle, the counter circuit, supplied with the pulse output of the photosensor 28, controls the copy control system 81 to effect the duplex copy. By this, the trailing edge stopper 24*a* of the interim tray 24 is moved from its X position to Y position to move forward the one sided copies on the interim tray 24 toward the re-feeding rollers 25 and 25*b*, which re-feed the bottommost one sided copy sheet, already having the image of the second original from the bottom on the first side thereof, toward the register rollers 20 and 20*a* through the fifth and sixth copy sheet paths Vb and Vb.

Similarly to the first cycle of the original feed, a toner image of the original on the platen glass 12 is formed on the photosensitive drum 16. The toner image is transferred by the transfer discharger 14*d* onto the second side, that is, the non-image bearing side, of the one sided copy sheet fed by the register rollers 20 and 20*a*. The copy sheet is separated from the drum 16 by the separation discharger 14*e* and conveyed to the fixing rollers 22 and 22*a*, which fix the toner image. Thus, a duplex copy is produced (116). The duplex copy is discharged to the discharge tray 27 by the discharge rollers 26 and 26*a* (113). The diversion gate 34 is changed to the first state shown by broken lines. The duplex copies are stacked on the tray 27 with the smaller pages up.

The original on the platen glass 12 is discharged in the same manner as described above.

Subsequently, the same operations as for the second original, from the bottom, are effected for the 4th, 6th . . . originals, while the same operations as for the 3rd original are effected for the 5th, 7th . . . originals (115, 116 and 117) until all the originals are treated, so that the second cycle completes. Thus, there are duplex copies on the tray 27 which are in the order of the pages. The detection of the termination of the second cycle may be made.

The detection of the second cycle completion may be made by the control circuit 70 counting, during the second cycle, the pulses of the photodetector 28 or by detecting by the photosensor 33 the trailing edge of the last one-sided copy sheet on the interim tray 24.

It is now assumed that the number of the originals is even. Firstly, the information that an even number of originals are placed on the table 1 is given to the control circuit 70 by unshown means (101) so that the control circuit discriminates that the number of originals is even (102). As in the foregoing embodiment, the originals are sequentially fed to the platen glass 12, and odd number pages of originals are copied by the copying assembly B to produce one sided copies. This can be made by the control circuit 70 receiving, after copy instructions, the pulse from the photodetector 28 and making the copy operation mode upon the odd number pulses detected. More particularly, upon every other pulse received from and including the first pulse, the copy mode operation is carried out. When the first, i.e., the bottommost original is fed to the platen glass 12 through the first and second original paths Ia and IIa (103), the control circuit supplied with the first pulse from the photodetector 28, controls the copy operation control system 81 to perform the copy operation, so that the first original is copied on a blank copy sheet fed from the cassette 18 by a known copy process (104), and then, the one sided copy sheet is discharged to the interim tray 24 (105).

At this time, the switch-back mechanism is in the second position shown by the phantom line so that the third copy sheet path IIIb is opened, while the eighth path VIIIb is closed. The copy sheet, passed through the nip of the fixing rollers 22 and 22*a*, moves through the third path IIIb and the fourth path IVb, and is accommodated on the interim tray 24 with its copy image facing up. After the copy operation, the original on the platen 12 is conveyed back through the seventh path VIIa and the sixth path VIa and discharged by the discharge rollers 11 and 11*a* to the topmost of the original stack.

Next, the second original from the bottom is fed onto the platen glass 12 in the same manner. The copying assembly does not operate for this original. This is accomplished, since the original feeding actuates the photodetector 28 to give a pulse to the control circuit 70, which then places the copy operation control system 81 is a non-operative state. Also, the original is conveyed back by the reversed rotation of the conveyor belt driving roller through the seventh and sixth original paths VIIa and VIa to the topmost of the original stack.

In the similar manner, the 3rd, 5th . . . originals are copied on one side of a blank copy sheet in the same manner as with the first originals, and the resultant one sided copy sheets are stacked on the interim tray 24 (103, 104 and 105). The 4th, 6th . . . originals are not copied, rather simply circulated, in the same manner as with the 2nd original.

Upon termination of the first cycle of the original feed, the photosensor 47 gives a pulse to the control circuit 70. This changes the control circuit 70 to the second cycle mode. During the second cycle, the 1st, 3rd, 5th . . . originals from the bottom are not copied, but merely circulated by the original feeder A. However, the 2nd, 4th . . . originals, when placed on the platen glass 12 (106), are copied on the back (second) side of the one sided copies accommodated on the interim tray 24, in the similar manner. Those one sided copy sheets are fed out of the interim tray 24 by the re-feeding rollers 25 and 25*a* toward the photosensitive drum 16. The one sided copy sheets are fed in the order of first, from the bottom of the originals, page image copy, third one, fifth one . . . . The copy sheet having received the toner image is conveyed through the second copy sheet path IIb and the nip between the fixing rollers 22 and 22*a* to become a duplex copy (107), which is in turn conveyed through the gate 34 taking the first position shown by the broken lines and through the eighth path VIIIb. Then, it is discharged by the discharge rollers 26 and 26*a* to the discharge tray 27 (108). Thus, duplex copies are stacked on the tray in the order of original pages.

The termination of the second cycle may be detected in the same manner as with odd-number original mode. As shown in the flow chart of FIG. 6, the control circuit 70 counts the originals in response to the original feed and compares the count M or M' with the already inputted number N of the originals to detect the termination of the original feed cycle.

Figure 17A:
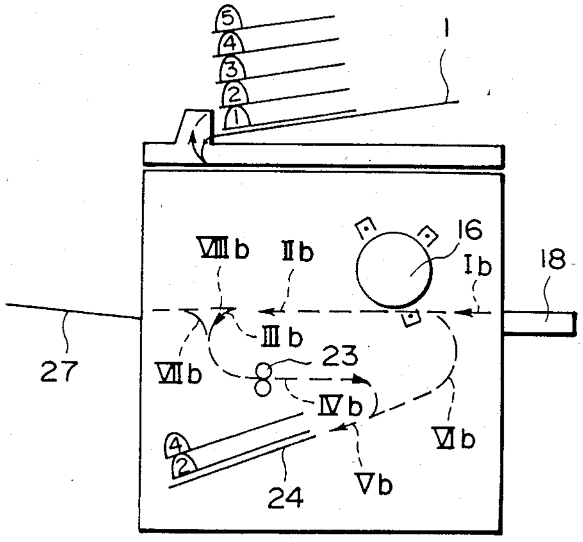
FIGS. 17A, 17B & 17C and 18A & 18B are schematic illustrations of the flow of originals in the method of FIG. 16.
Figure 17B:
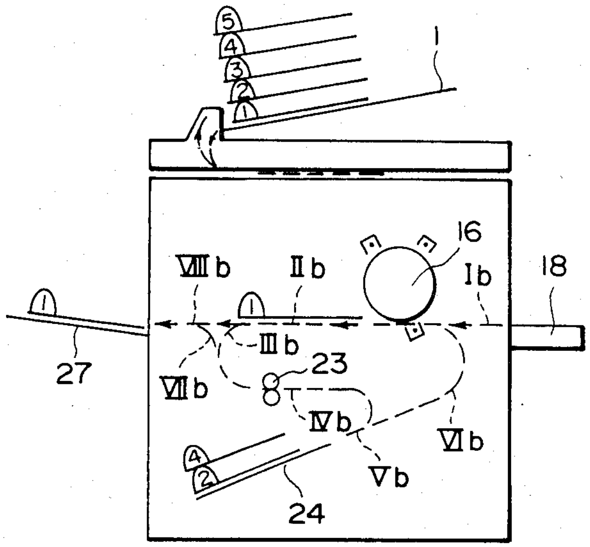
Figure 17C:
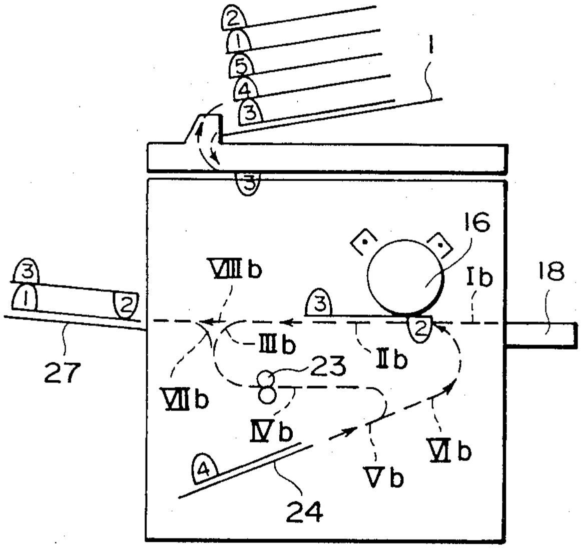
Figure 18A:
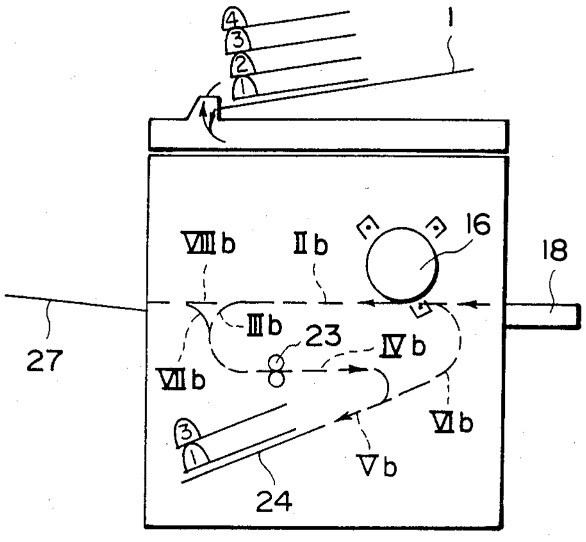
Figure 18B:
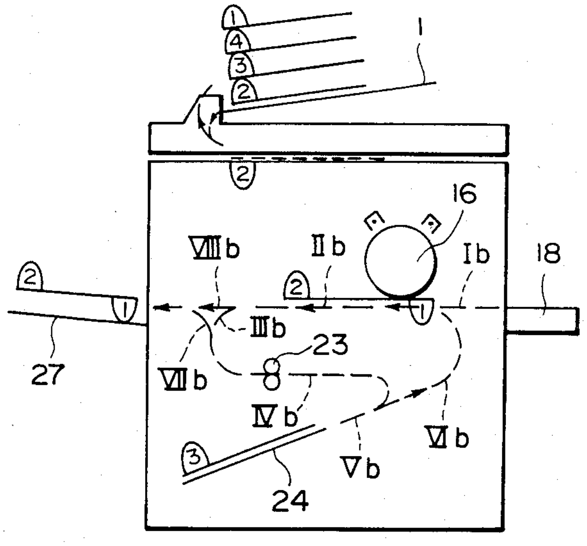

For the better understanding of this embodiment, FIGS. 17A, 17B, 17C, 18A and 18B illustrate operations of the apparatus according to the present embodiment. FIGS. 17A, 17B and 17C show them when an odd number of originals are placed on the original table 1, and in the case where the even number pages, from the bottom, are copied first, and then the odd number pages are copied in the second cycle. FIGS. 18A and 18B show the operations when an even number of originals are placed on the original table 1, and in the case where the even number pages are copied in the first cycle, and then the odd number pages are copied in the second cycle. The operation advances in the order of FIGS. 17A, 17B and 17C, and 18A and 18B. In these Figures, the numerals given to the originals on the original table 1 are the numbers of pages, as counted from the bottom of the original stack. The numerals are placed on such a side of an original that bears the image. A copy sheet having a numeral bears the image of the original of the corresponding page. The copy image is formed on the side having the numeral. Those Figures will be readily understood together with the explanations made hereinbefore, and therefore, detailed explanations are omitted for the sake of simplicity.

Figure 7B:
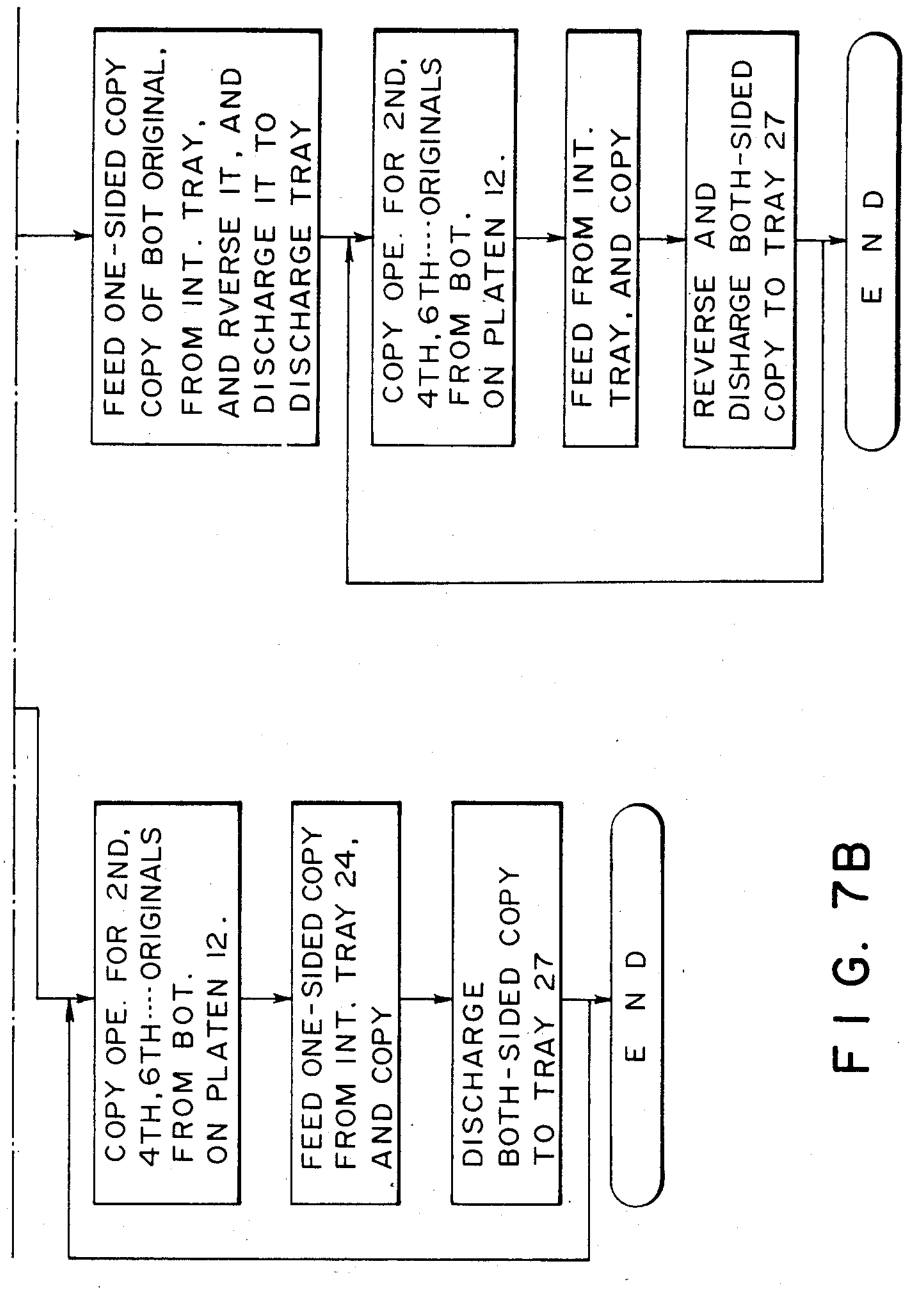

When two or more sets of copies are needed, the number of sets required is stored. The 1st, 2nd, 3rd . . . originals from the bottom are copied, when the total number of originals is even. For the duplex copy, the rest of the originals are copied as shown in FIG. 7B in the order of 2nd, 4th, 6th . . . The sequence of the operation is the same as the case where the 1 st, 3rd, 5th . . . originals are copied to produce one sided copies. No reversal by the switch-back mechanism is effected.

If the number of the originals is odd, the 2nd, 4th, 6th . . . originals, from the bottom, are copied by the copying assembly B, and then, the first (bottommost), 3rd, 5th . . . originals are copied in the similar manner as with the 2nd, 4th, 6th . . . originals. The reversal by the switch-back mechanism is not required for the duplex copies to be discharged in the proper order. This method is effective when a sorter is used with the copying assembly.

Figure 19A:
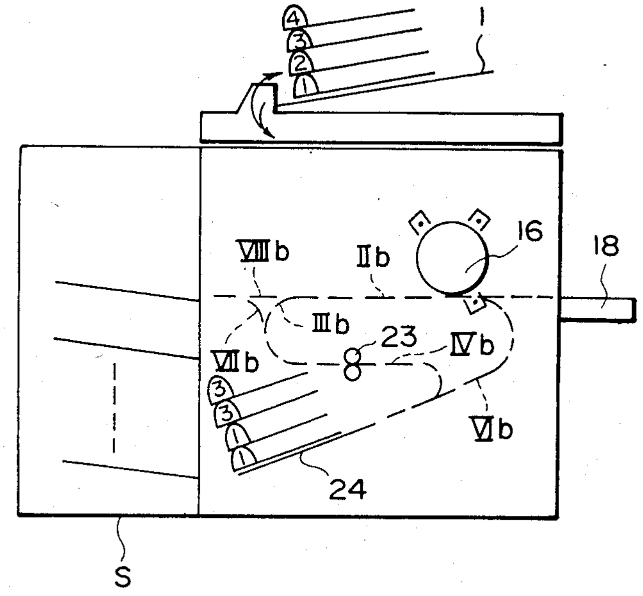
FIGS. 19A and 19B are schematic illustrations of the flow of originals in a method according to a further embodiment of the present invention.
Figure 19B:
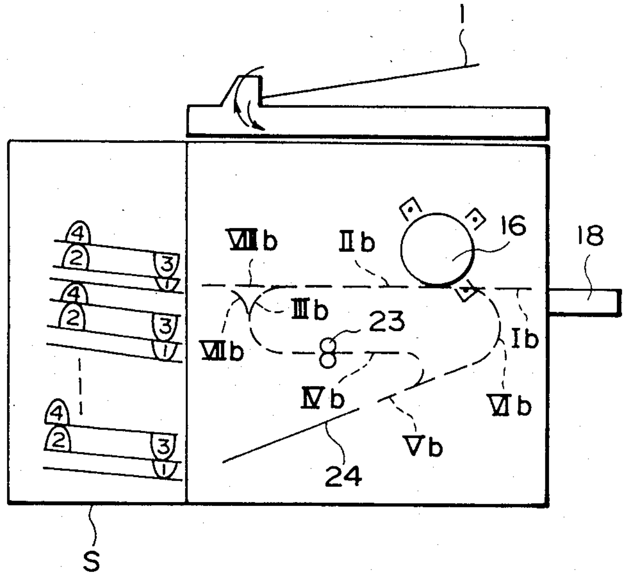

Referring to FIG. 19A, there is shown an example wherein n sets of even number (e.g. four) originals are produced. First, the 1st and 3rd originals, from the bottom, are copied on n sheets, which are in turn accommodated on the interim tray 24. In the second original feed cycle, the 2nd and 4th originals are copied on the back sides of the respective one sided copies, whereafter the duplex copies are discharged to the sorter S, as shown in FIG. 19B.

The necessary change of the copying assembly from the simplex copy mode to the duplex copy mode, can be made on an unshown operation board.

As described above, according to the present invention, the necessity of the copy sheet reversal is removed when the duplex copies are discharged, so that the copy, i.e., printing speed is increased and so that the length of the path can re reduced.

Figure 20A:
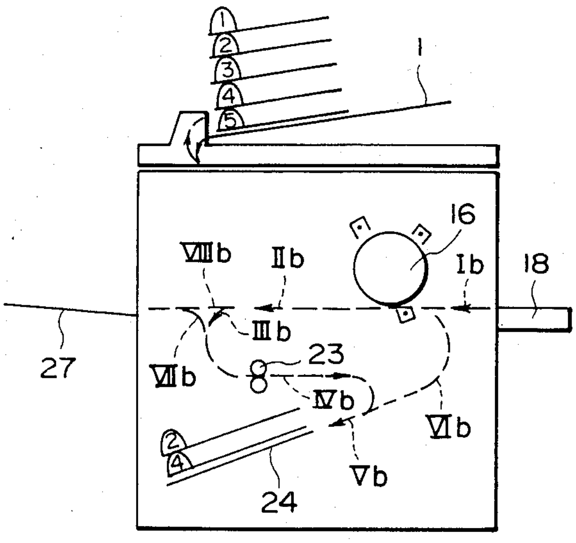
FIGS. 20A, 20B, 20C, 21A and 21B are schematic illustration of the flow of originals in a method according to a further embodiment of the present invention.
Figure 20B:
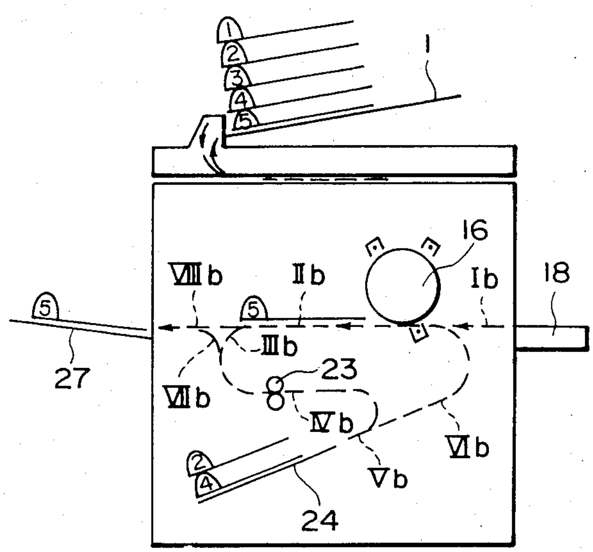
Figure 20C:
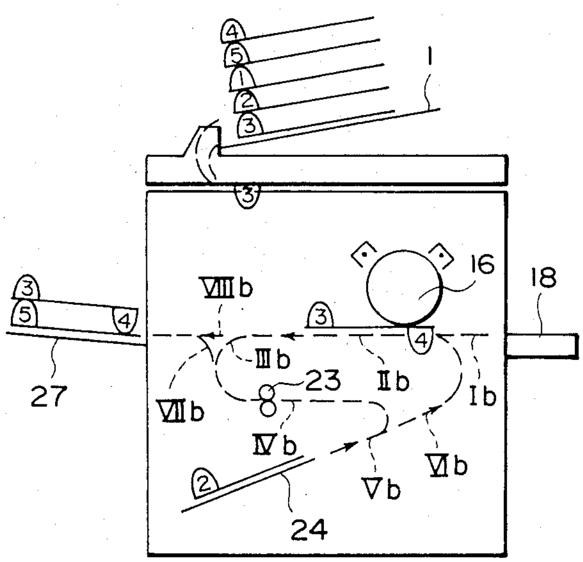
Figure 21A:
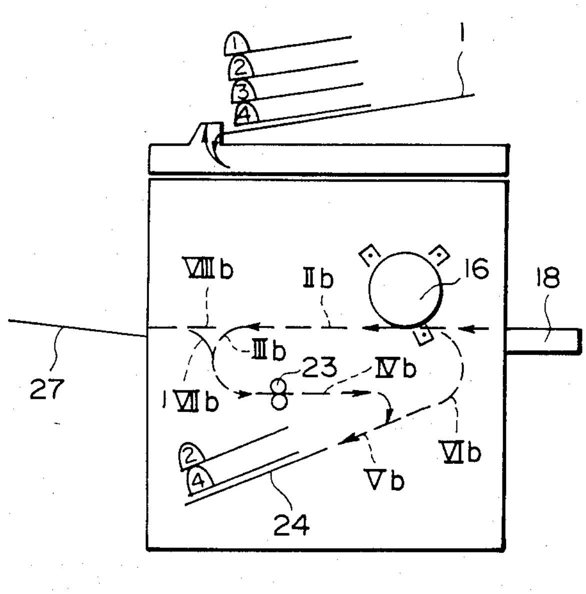
Figure 21B:
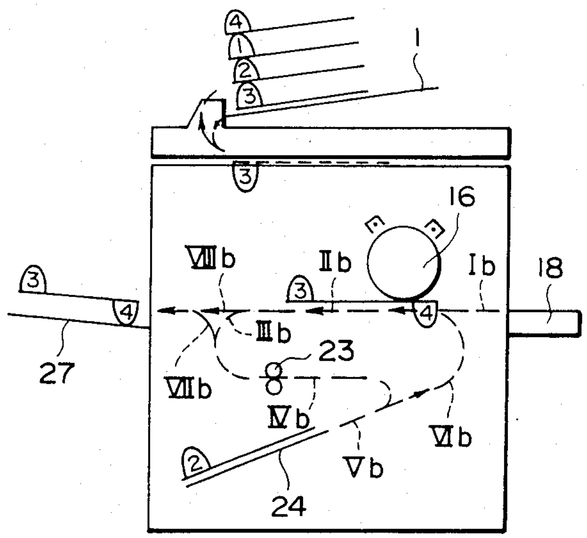

FIGS. 20A, 20B, 20C, 21A and 21B illustrate the same operations, in these Figures, the originals are given the page numbers, not the number as counted from the bottom. FIGS. 20A, 20B and 20C show the opeations when an odd number of originals are placed on the original table 1, corresponding to FIG. 16 (odd number). FIGS. 21A and 21B show the operations when an even number of originals are placed on the original table 1, corresponding to FIG. 16 (even number).

While the invention has been described with reference to the structures disclosed herein, it is not confined to the details set forth and this application is intended to cover such modifications or changes as may come within the purposes of the improvements or the scope of the following claims.

What is claim is:

1. A method of producing duplex copies from simplex originals, comprising:
- sequentially feeding one at a time simplex originals from a stack of simplex originals to a reading position;
- performing, for every other fed original, a first copy operation to produce one sided copies from said every other original;
- sequentially feeding again one at a time the same orignals; and
- performing, for every other remaining fed original, a second copy operation to form images on such sides of the one sided copy as do not bear the images by the first copy operation step, to produce duplex copies from simplex originals;
- wherein in the feeding step, the originals are fed, while being inverted, to the reading position from one side thereof, and then are fed back, while being inverted back, from said one side of the reading position to the stack.

2. A method according to claim 1, wherein, when the number of the originals in the original stack is odd, the second copy operation is effected, for the first, as counted from the bottom, original, on a blank copy sheet, not on the one sided copy sheet, and effected for the rest of the remaining every other fed originals, on the one sided copy sheets.

3. A method according to claim 1, wherein, when the number of the originals in the original stack is even, the second copy operation is effected, from the start, for the remaining every other fed originals, on the one sided copy sheets.

4. A method of producing duplex copies from simplex originals, comprising:
- sequentially feeding one at a time simplex originals from a stack of simplex originals to be reproduced as duplex copies;
- performing, when the number of the original in the stack is even, for only odd number originals as counted from the bottom of the stack, first copy operation to produce one sided copies from them; and performing, when the number of the original in the stack is odd, for only even number originals as counted from the bottom of stack, first copy operation to produce one sided copies from them;
- sequentially feeding again one at a time the same originals; and
- performing, when the number of the original in the stack is even, for only even number originals as counted from the bottom of the stack, second copy operation to produce duplex copies; and performing, when the number of the original in the stack is odd, for only odd number originals as counted from the bottom of the stack, second copy operation to produce duplex copies.

5. A method of producing duplex copies from simplex originals, comprising:
- sequentially feeding one at a time simplex originals from a stack of simplex originals to a reading position, and discriminating whether the number of the originals in the stack is even or odd;
- performing, for every other fed original, a first recording operation to produce one sided printings from said every other original;
- sequentially feeding again one at a time the same originals;
- performing, when the number of originals is even, for every other remaining fed original, a second printing operation to form images on such sides of the one sided printing as do not bear the images by the first copy operation step; and performing, when the number of originals is odd, for the last page original, a second printing operation to form an image thereof on a blank sheet, and performing for every other remaining fed original, the second printing operation on such sides of the one sided printing as do not bear the images by the first copy operation step;
- wherein in the feeding step, the originals are fed, while being inverted, to the reading position from one side thereof, and then are fed back, while being inverted back, from said one side of the recording position to the stack.

6. An apparatus for producing duplex copies from simplex originals, comprising:
- stacking means for supporting a stack of originals;
- conveying means for inverting and conveying the originals one at a time to a reading position;
- recording means for recording an image corresponding to said original on a sheet;
- control means for controlling said conveying means and recording means to perform, when the number of the original in the stack is even, for only odd numbered originals as counted from the bottom of the stack, a first recording operation to produce one sided copies from them; and to perform, when the number of the originals in the stack is odd, for only even numbered originals as counted from the bottom of stack, a first recording operation to produce one sided copies from them; and then to perform, when the number of the originals in the stack is even, for only even numbered originals as counted from the bottom of the stack, a second recording operation to produce duplex copies; and to perform, when the number of the originals in the is odd, for only numbered originals as counted from the bottom of the stack, a second recording operation to product duplex copies.

7. An apparatus for producing duplex copies from simplex originals, comprising:

stacking means for supporting a stack of originals;

conveying means for conveying the originals one at a time;

inverting means for receiving and inverting the original fed by said feeding means;

means for receiving and feeding the inverted original to a reading position and then reversing to discharge the original from the reading position;

means for receiving and inverting the original discharged from the reading position and feeding it back to said original stacking means;

recording means for recording an image corresponding to a said original on a sheet;

control means for controlling said conveying means and recording means to sequentially feed one at a time simplex originals from a stack of simplex originals to be reproduced as duplex printings, and discriminating whether the number of the originals in the stack is even or odd; to perform, for every other fed original, a first recording operation of said recording means to produce one sided printings from said every other original; to sequentially feed again one at a time the same originals; to perform, when the number of original is even, for every other remaining fed original, a seoond pringing operation to form images on such side of the one sided printing as do not bear the images by the first copy operation step; and to perform, when the number of originals is odd, for the last page original, a second printing operation to form an image thereof on a blank sheet, and then to perform for the rest of every other remaining fed original, a second printing operation of such sides of the one sided printing as do not bear the images by the first copy operation step.

8. A method according to claim 1, wherein while the originals are fed for the first simplex copies, the number of the originals are counted to discriminate whether the number is even or odd.

9. A method according to claim 8, wherein pulses are generated in response to the individual passages of the originals by a certain position, and wherein the pulses are counted to determine the number of the originals.

10. A method according to claim 1, wherein the originals are stacked face-up in forward serial order from the top of the stack.

11. A method according to claim 1, wherein every other original is copied on the first side of copy sheets, respectively, and wherein the copy sheets are once stored in an intermediate tray, and are fed out therefrom one by one.

12. A method according to claim 4, wherein when the number of the originals to be copied is odd, and the odd numbered pages as counted from the bottom of the stack are sequantially copied from the bottoms, the bottom-most original is copied on a fresh copy sheet, which is then discharged directly.

13. A method according to claim 4, wherein the number of the originals is inputted prior to the copying operation.

14. A method according to claim 5, wherein the even numbered pages as counted from the bottom of the stack are sequentially copied from the bottom, and if the number of the originals is even, the copy sheet is inverted and discharged.

15. A method according to claim 5, wherein the odd numbered pages as counted from the bottom of the stack are sequentially copied from the bottom, and if the number of the originals is odd, the copy sheet is inverted and discharged.

16. A method according to claim 5, wherein the originals are fed one at a time, and every other original is copied, while the number of the originals is counted.

17. A method according to claim 16, wherein pulses are generated in response to individual passages of the originals by a certain position, and wherein the pulses are counted to determine the number of the originals.

18. A method according to claim 1, wherein copy images are formed on first sides of copy sheets from one original, then the copy sheets are once stored in a storing position from which the copy sheets are fed out, and copy images are formed on second sides of those fopy sheets from another original, and subsequently those cooy sheets are sorted by a sorter.

19. An image forming apparatus, comprising:

means for stacking sheet originals in the form of a stack;

means for separating and feeding out the bottom-most of the stack of originals;

means for receiving the original from said separating and feeding means and inverting the same;

means for receiving and feeding the inverted original to a reading position and then reversing the original to discharge it from the reading position;

means for receiving and inverting the original discharged from the reading position and feeding it back to said original stacking means;

means for counting number of the originals;

control means for idly feeding the originals, while counting the number of the originals to determine whether the number is odd or even, and for thereafter forming images of two simplex originals on respective sides of a copy sheet.

20. An apparatus according to claim 19, further comprising storing means and sorter means, wherein copy images are formed on first sides of copy sheets from one original, then the copy sheets are once stored in the storing means, from which the copy sheets are fed out, and copy images are formed on second sides of those copy sheets from another original, and subsequently those copy sheets are sorted by the sorter.

21. An apparatus according to claim 19, wherein said counting means include pulse generating means for generating pulses in response to individual passages of the originals by a certain position, and wherein the pulses are counted to determine the number of the originals.

22. An apparatus according to claim 19, wherein the originals are stacked face-up in forware serial order from the top of the stack.

23. An apparatus according to claim 19, further comprising an intermediate tray for accommodating copy sheets having first sides on which images are formed, wherein the copy sheets are fed out of the intermediate tray one at a time.

24. A method according to claim 9, wherein the determination is effected by detecting a state of flip-flop means responsive to passages of the originals, when all the originals are passed.

25. A method according to claim 24, wherein the passage of all of the originals are detected by detecting rotation of a rotatable partition plate.

26. A method according to claim 24, wherein the partition plate is an arm member contractable to the top-most original of the stack.

27. A method according to claim 9, wherein discrimination is made as to whether the original at the reading position is an odd number original or an even number original on the basis of a state of a flip-flop circuit.

* * * * *

UNITED STATES PATENT AND TRADEMARK OFFICE

CERTIFICATE OF CORRECTION

PATENT NO. : 4,607,948

DATED : August 26, 1986

INVENTOR(S) : MASATAKA NAITO

It is certified that error appears in the above-identified patent and that said Letters Patent is hereby corrected as shown below:

IN THE ABSTRACT:

Cover page, line 5, change "originals" to --original--; same line, before "first" insert --a--;

line 6, change "originals" to --original--;

line 8, after "for" insert --every other--; same line, delete "every other"; same line, change "originals" to --original--;

line 9, before "second" insert --a--.

Cover page, last line, change "45" Drawing Figures to --47-- Drawing Figures.

IN THE SPECIFICATION:

Column 1, line 26, change "originals" to --original--;

line 32, change "originals" to --original--.

Column 2, line 12, change "illustration" to --illustrations--;

line 15, after "are" delete "a"; same line, change "chart" to --charts--;

line 25, change "illustration" to --illustrations--;

line 31, change "of" to --with--;

line 35, after "limited" insert --to--;

line 43, change "and" to --are--;

line 53, change "mechanisms" to --mechanism--.

Column 3, line 17, after "28" insert --,--.

Column 4, line 60, change "roller" to --rollers--.

UNITED STATES PATENT AND TRADEMARK OFFICE

CERTIFICATE OF CORRECTION

PATENT NO. : 4,607,948

DATED : August 26, 1986

INVENTOR(S) : MASATAKA NAITO

It is certified that error appears in the above-identified patent and that said Letters Patent is hereby corrected as shown below:

Column 5, line 5, change "roller" to --rollers--;
line 6, after "of" insert --the--;
line 42, change "arrangement" to --arrangements--.

Column 6, line 50, after "conjunction" insert --with--.

Column 9, line 34, change "sides" to --side--; same line, after "of" insert --the--.

Column 10, line 61, change "*and*" to --and--.

Column 11, line 41, change "is" to --are--;
line 51, change "roller" to --rollers--.

Column 12, line 11, change "charge" to --charging--;
line 15, change "l" to --1--.

Column 13, line 10, after "bottom" insert --,--;
line 42, after "7th" insert --...--.

Column 14, line 2, change "detail" to --detailed--.

Column 15, line 27, change "a" to --b--.

Column 16, line 2, change "sides" to --sided--;
line 33, change "l" to --1--;
line 34, after "original," insert --as--; same line, after "bottom" insert --,--;
line 39, change "," (after "cycle") to --;--;
line 49, change "Vb and Vb" to --Vb and VIb--.

UNITED STATES PATENT AND TRADEMARK OFFICE
CERTIFICATE OF CORRECTION

PATENT NO. : 4,607,948

DATED : August 26, 1986

INVENTOR(S) : MASATAKA NAITO

It is certified that error appears in the above-identified patent and that said Letters Patent is hereby corrected as shown below:

Column 18, line 57, change "1 st" to --1st--.

Column 19, line 17, change "re" to --be--;

line 19, after "operations" change "," to --;--;

line 34, change "claim" to --claimed--;

line 55, change "1" to --8--;

line 60, change "originals" to --original--;

line 62, change "1" to --8--;

line 65, change "originals" to --original--.

Column 21, line 4, before "is" insert --stack--; same line, after "only" insert --odd--;

line 6, change "product" to --produce--;

line 33, change "seoond" to --second--; same line, change "pring-" to --print- --;

line 41, after "operation", change "of" to --on--;

line 63, change "sequantially" to --sequentially--; same line, change "bottoms" to --bottom--.

Column 22, line 22, change "fopy" to --copy--;

line 24, change "cooy" to --copy--;

UNITED STATES PATENT AND TRADEMARK OFFICE

CERTIFICATE OF CORRECTION

PATENT NO. : 4,607,948

DATED : August 26, 1986

INVENTOR(S) : MASATAKA NAITO

It is certified that error appears in the above-identified patent and that said Letters Patent is hereby corrected as shown below:

Column 22, line 28, change "bottom-most" to --bottommost--;
line 60, change "forware" to --forward--.

Signed and Sealed this

Tenth Day of February, 1987

*Attest:*

DONALD J. QUIGG

*Attesting Officer*

*Commissioner of Patents and Trademarks*